United States Patent [19]

Lotspiech et al.

[11] 4,377,803

[45] Mar. 22, 1983

[54] ALGORITHM FOR THE SEGMENTATION OF PRINTED FIXED PITCH DOCUMENTS

[75] Inventors: Jeffrey B. Lotspiech, Boulder; Wayne L. Wohler, Longmont, both of Colo.

[73] Assignee: International Business Machines Corporation, Armonk, N.Y.

[21] Appl. No.: 165,879

[22] Filed: Jul. 2, 1980

[51] Int. Cl.³ .............................................. G06K 9/34
[52] U.S. Cl. ........................................... 382/9; 382/18
[58] Field of Search ............. 340/146.3 H, 146.3 SG, 340/146.3 Y, 146.3 R; 358/260-262

[56] References Cited

U.S. PATENT DOCUMENTS

| | | | |
|---|---|---|---|
| 3,164,806 | 1/1965 | Rabinow | 340/146.3 SG |
| 3,219,974 | 11/1965 | Rabinow | 340/146.3 SG |
| 3,629,826 | 12/1971 | Cutaia et al. | 340/146.3 SG |
| 4,003,025 | 1/1977 | Hilliard et al. | 340/146.3 S |
| 4,024,500 | 5/1977 | Herbst et al. | 340/146.3 SG |
| 4,034,343 | 7/1977 | Wilmer | 340/146.3 MA |
| 4,045,773 | 8/1977 | Kadota et al. | 340/146.3 SG |
| 4,083,034 | 4/1978 | Hicks | 340/146.3 H |
| 4,251,799 | 2/1981 | Jih | 340/146.3 Y |

OTHER PUBLICATIONS

Bishop et al., "Char. Rec. Approach Involving Histogram Class," *IBM Tech. Disclosure Bulletin*, vol. 21, No. 9, Feb. 1979, pp. 3461-3467.
Baumgartner, "Iterative Segmentation," *IBM Tech. Disclosure Bulletin*, vol. 14, No. 9, Feb. 1972, pp. 2643-2644.
Baumgartner et al., "Left-Side Detection Segmentation," *IBM Tech. Disclosure Bulletin*, vol. 17, No. 2, Jul. 1974, pp. 508-509.
Kerchmar, "Amount Line Finding Logic," *IBM Tech. Disclosure Bulletin*, vol. 15, No. 5, Oct. 1972, pp. 1531-1532.

*Primary Examiner*—Leo H. Boudreau
*Attorney, Agent, or Firm*—J. G. Cockburn; C. M. Wright

[57] ABSTRACT

An apparatus and method is provided for segmenting characters generated by an optical scanner. The apparatus also identifies underscores. The underscores are then masked and subsequent processing devices are informed of the existence of said underscores. Input video raster scans representative of a portion of a line of textual material are loaded into a video buffer. The video raster scans are broken up into a plurality of sections. The horizontal histogram (number of black pixel counts) associated with each section is determined. The baseline, vertical histogram and word location for each line of data to be segmented is determined. A find character unit finds the boundaries for each character. The character is sequentially transferred from the video buffer to a character output buffer.

18 Claims, 14 Drawing Figures

This is a typical normally oriented print line.

The baseline is a line on which the characters "rest."

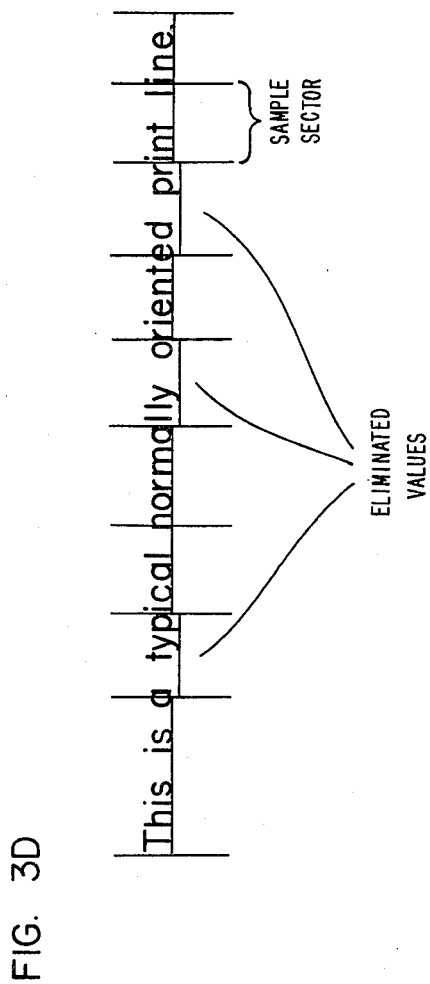

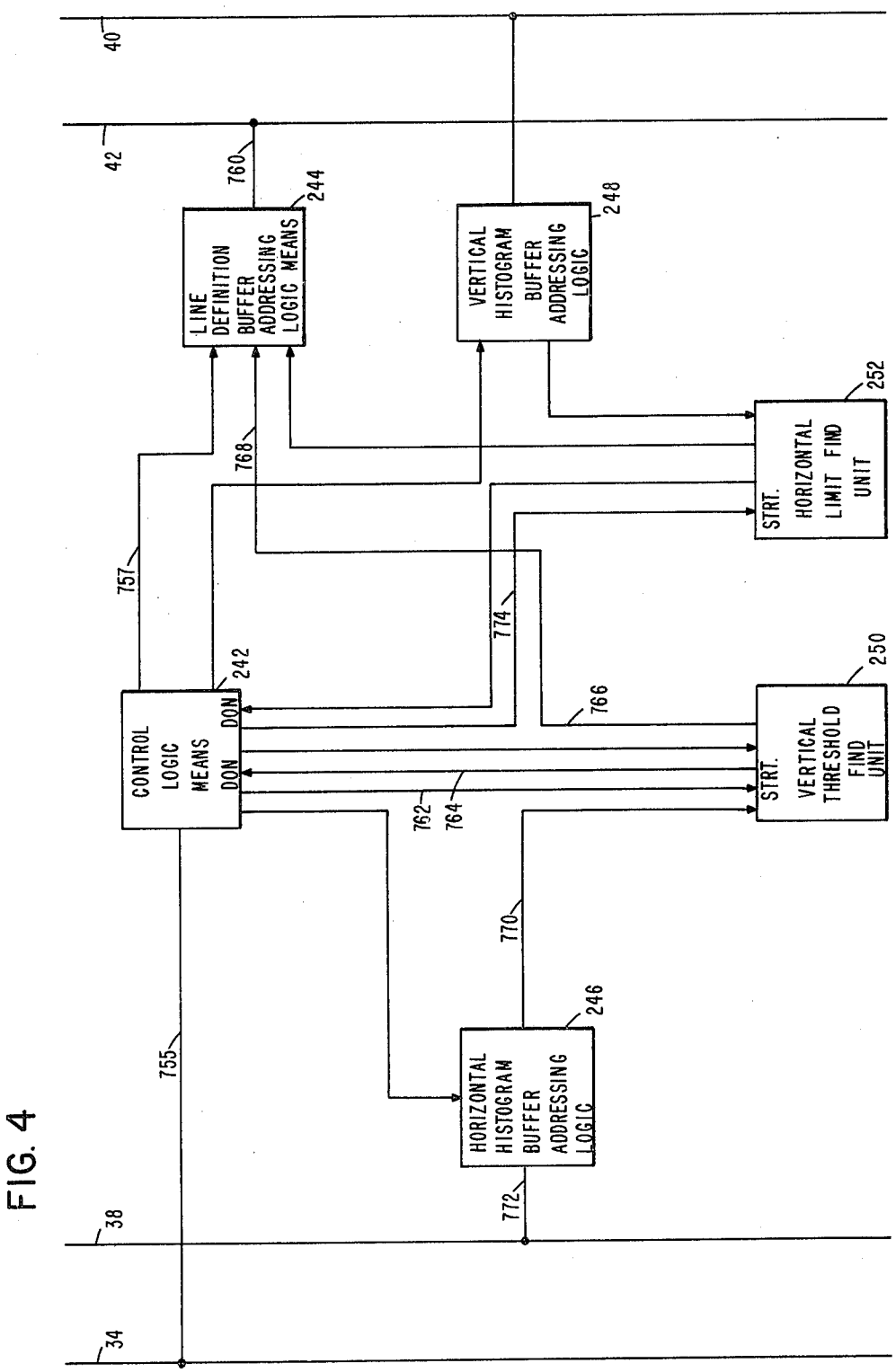

ALGORITHM FOR THE SEGMENTATION OF PRINTED FIXED PITCH DOCUMENTS

BACKGROUND OF THE INVENTION

1. Field of the Invention

The present invention relates to Optical Character Recognition (OCR) systems and, more particularly, to the character segmentation devices associated with said systems.

2. Prior Art

The use of OCR devices as a means for disseminating recorded information is well known in the prior art. The OCR devices include an optical scanner which scans an original document and generates a video stream of data. The data is representative of the information recorded on the document. The individual characters associated with the video data stream are recognized and coded to minimize the amount of data which has to be transferred. The coded data is then transmitted to remote locations over telephone lines, satellites, microwave links, etc.

The segmentation process is one of the necessary steps associated with the recognition routine. The segmentation process attempts to find the boundaries for characters associated with a line of scanned data. One method used in the prior art to isolate characters is the so-called "White Space Segmentation" method. The "White Space Segmentation" method isolates character(s) based on the white space between the printed characters of a print line. One example of the "White Space Segmentation" method is described in an article entitled "Iterative Segmentation" by R. J. Baumgartner, published in the IBM TECHNICAL DISCLOSURE BULLETIN at Vol. 14, No. 9, February 1972 (pages 2643-2644). A scanner raster scans characters and passes video data to a video block processor. The processor forms nontouching character blocks. The character blocks include one or more characters. Block information including block height, position and length are calculated and are used to determine pitch. The problem associated with this type of segmentation is that touching characters are not segmented.

U.S. Pat. No. 4,083,034 discloses another prior art apparatus and method for segmenting characters. The system is able to segment touching and overlapping characters. A linear sensor array scans an informational field and generates a binary data stream therefrom. The binary data stream is circulated through a shift register memory to a scan assembly memory mosaic. A stationary memory window of the shift register memory is provided to plural trackers at the shift rate. The trackers are activated on a priority basis as center cells of the memory window satisfy a start condition and continue to trace between center cells satisfying an adjacency condition. Uppermost and lowermost center cell coordinates center cell counts and scan counts for each tracker are provided throughout a tracing operation.

A read-only memory control unit evaluates each tracker and marks valid those trackers tracing character information. Valid tracker information is then merged and evaluated to detect and locate valid characters in the binary information stream. The valid characters are centered in the memory mosaic for output to succeeding systems.

Although the latter mentioned prior art is an improvement over the "White Space Segmentation" method, it does not address the problem of segmenting documents having underscore characters and/or variable spacing between words. Variable interword spacing and underscoring are characteristics associated with a good many documents to be processed. Therefore, a complete and comprehensive segmentation device should be able to handle documents having variable interword spacing and underscoring.

Another drawback with the latter mentioned prior art is that it requires a special formatting unit to format the data outputted from the linear scanner prior to segmentation.

SUMMARY OF THE INVENTION

It is therefore the main object and general purpose of the invention to provide a new and efficient apparatus adapted for use in an OCR system to segment scanned characters.

It is another object of the present invention to segment characters of documents having variable spacing between words.

It is still another object of the present invention to identify underscore characters associated with a document and to formulate a coding scheme whereby the underscore characters are reproduced.

The invention provides an apparatus for determining the boundaries of characters in a typewritten data field. The apparatus determines the boundaries for touching characters, overlapping characters, characters having variable spacing between words and underscore characters.

More particular input raster scans, representative of a line of data to be segmented, are placed into a video buffer. As a scan is placed into the buffer, it is separated into a plurality of sectors. A horizontal histogram unit finds the horizontal histogram (number of black picture elements) associated with each sector. A find baseline unit uses the horizontal histogram to calculate the "baseline." A vertical histogram unit uses the raster scan data in the video buffer and the "baseline" to calculate the vertical histogram. The "pitch" (that is the center-to-center spacing of adjacent characters) is ascertained. The vertical histogram data and the pitch data are used by a "find word unit" to find the "word" location of the line to be segmented. The word location data and the vertical histogram data are utilized by a find character unit to locate each character. As a character is located, it is shifted by a shift array from the video buffer into a character output buffer. A control means (microprocessor) is provided to monitor the units and activate each unit sequentially.

In one feature of the invention a "find pitch unit" uses the vertical histogram data to calculate the pitch.

In another feature of the invention a find underscore unit finds underscore associated with the data to be segmented. The find underscore unit uses the horizontal histogram data and the baseline data to identify the underscore.

The foregoing and other features and advantages of the invention will be apparent from the following more particular description of the preferred embodiment of the invention, as illustrated in the accompanying drawings.

BRIEF DESCRIPTION OF THE DRAWINGS

FIG. 3D shows a graphical representation of a sectored baseline.

FIG. 4 is a schematic of the functional components of the find underscore unit.

DETAILED DESCRIPTION OF THE PREFERRED EMBODIMENT

Figure 1:
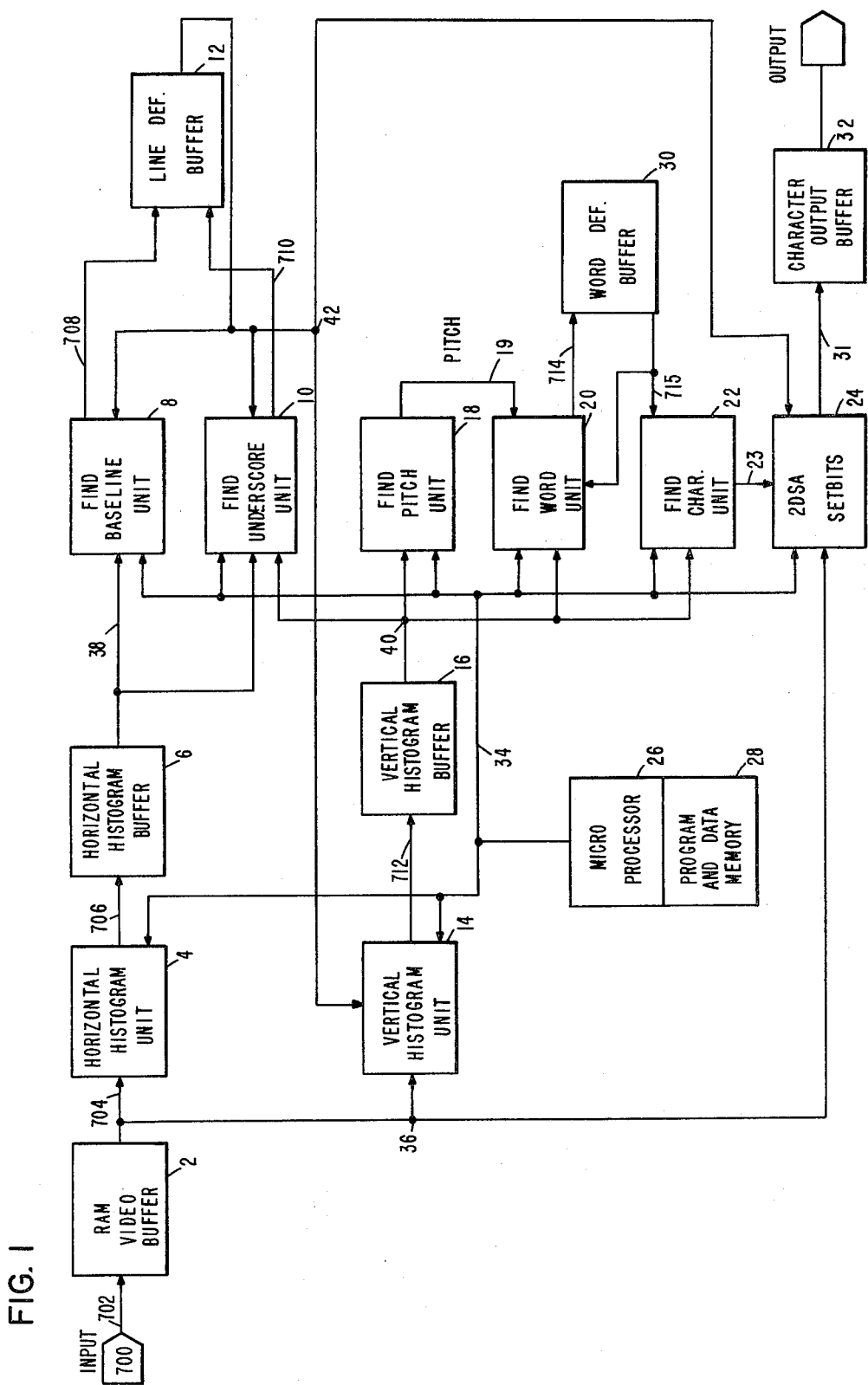
FIG. 1 shows a functional block diagram of a segmentation apparatus according to the teaching of the present invention.

FIG. 1 is a functional block diagram of a segmentation apparatus according to the teaching of the present invention. Video data to be segmented is generated by scanner 700 and is fed over conductor 702 into random access memory (RAM) video buffer 2. The output of the video buffer is coupled over conductor 704 into horixontal histogram unit 4. The horizontal histogram unit is connected by microprocessor bus 34 to microprocessor 26. The horizontal histogram unit, under the control of a microprocessor 26 together with its program and data memory 28, interrogates the video data in the video buffer and generates a horizontal histogram (that is number of black PELs) associated with each segment of the video data. The horizontal histogram for each sector is loaded into horizontal histogram buffer 6 over conductor 706. The output of the horizontal histogram buffer 6 is coupled over horizontal histogram buffer bus 38 to the find baseline unit 8 and the find underscore unit 10. The find baseline unit is also controlled by the microprocessor 26 over microprocessor bus 34. The find baseline unit 8 uses the horizontal histogram information stored in the horizontal histogram buffer 6 to calculate baselines. As is used in this application, the word baseline means an imaginary line on which all nondescending characters rest or lie. The output from the find baseline unit is transmitted over conductor 708 into the line definition buffer (line def. buffer) 12.

The find underscore unit 10 is coupled to the horizontal histogram buffer 6 by the horizontal histogram buffer bus 38. The function of the find underscore unit 10 is to determine the underscore associated with the incoming data. The find underscore unit is coupled over conductor 710 to the input of the line definition buffer 12. Enabling and disabling of the find underscore unit is achieved by the microprocessor over microprocessor bus 34. Another input to the find underscore unit is the output from the vertical histogram buffer 16. The find underscore unit is connected to the vertical histogram buffer by the vertical histogram buffer bus 40. The vertical histogram buffer 16 is coupled over conductor 712 to vertical histogram unit 14. As will be explained subsequently, the vertical histogram unit accepts scanned video data over video buffer bus 36 and finds the vertical histogram (that is the number of black PELs in a vertical line) associated with the data. The vertical histogram unit is controlled by the microprocessor over microprocessor bus 34. The output from the vertical histogram buffer 16 is fed over vertical histogram buffer bus 40 to the find pitch unit 18, the find word unit 20 and the find character unit 22. Each of these units will be described in detail hereinafter. Suffice it to say, at this point, that the find pitch unit interrogates the dat outputted from the vertical histogram buffer to determine the pitch associated with the data. In some cases the pitch of a document is known, therefore the find pitch unit is rendered inoperable. Likewise, the find word unit determines the word associated with the line of data stored in the video buffer. Also the find character unit segments, that is isolates, the characters associated with a line of data. The output from the find word unit is fed over conductor 714 into the word definition buffer 30. The output from the word definition buffer is fed over conductor 716 into the find character unit. As will be explained subsequently, as each character is located, the find character unit notifies the microprocessor 26 which then commands the two-dimensional shift array set bits unit 24 (2 DSA set kits) to move the character from the video buffer to the character output buffer 32, registering (centering) the character as it does this and setting some bits further describing the character. The two-dimensional shift array 24 uses a character position data over the character position bus 23 from the find character unit 22 to ascertain where in the video buffer the character should be fetched from.

Horizontal Histogram Unit

Figure 2:
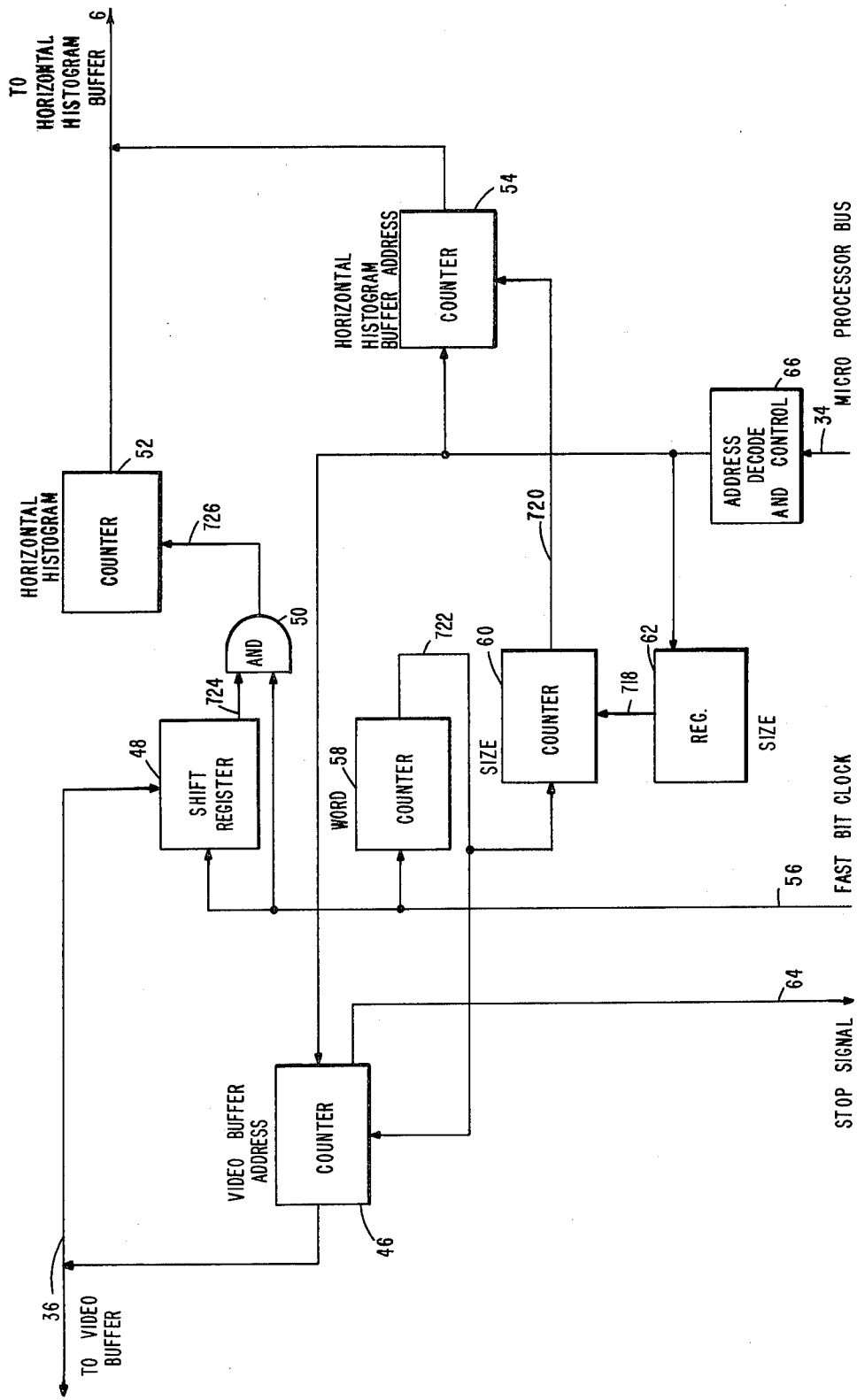
FIG. 2 shows a functional block diagram of the horizontal histogram unit.

Referring now to FIG. 2, a detailed block diagram of the horizontal histogram unit 4 (FIG. 1) is shown. The function of the horizontal histogram unit is to access a scan of video data in the video buffer, separate the scan of data into a plurality of segments and to determine the horizontal histogram, that is number of black PELs, associated with each sector of the scan. The horizontal histogram unit comprises of a plurality of interconnected components. The components coact to generate a plurality of counts representative of the number of black picture elements (PELs) associated with each segment. The horizontal histogram unit comprises of a plurality of interconnected counters, registers and logic means. The unit is under the control of the microprocessor 26 (FIG. 1). As a prelude to the beginning of the operation (that is the find horizontal histogram), certain registers and counters in the unit are initialized. The microprocessor 26 (FIG. 1) places the address of the registers and counters it wishes to initialize, together with the initializing data, on the microprocessor bus 34. The address decode and control logic 66 recognizes these addresses and causes the appropriate register or counter to be initialized. The registers and counters so initialized are the sector size register 62, the video buffer address counter 46 and the horizontal histogram buffer address counter 54. The sector size register 62 is a holding register which is loaded by the microprocessor over the microprocessor bus 34. The sector size register 62 contains information relative to the size of a video sector scan in the video buffer 2 (FIG. 1). The output from the sector size register 62 is coupled over conductor 718 to size counter 60. The output from the size counter 60 is fed over conductor 720 to horizontal histogram buffer address counter 54. The horizontal histogram buffer address counter 54 dynamically calculates the address at which the horizontal histogram count relative to a particular sector must be stored in the horizontal histogram buffer 6. Another input to the size counter 60 is generated by word counter 58 over conductor 722. The information on conductor 722 is used for stepping the video buffer address counter 46. The video buffer address counter 46 dynamically generates the address at which segments in the video buffer 2 (FIG. 1) must be obtained.

Still referring to FIG. 2, after initializing sector size register 62, the video buffer address counter 46 and the horizontal histogram buffer address counter 54, the microprocessor 26 (FIG. 1) presents an address on the microprocessor bus 34. The address is decoded by the address decode and control means 66. The address signals the horizontal histogram unit to begin operation. At this time, the word counter 58 and horizontal histogram counter 52 are cleared and the sector size counter 60 is loaded with the contents of the sector size register 62. The address in the video buffer address counter 46 is presented over the video buffer bus 36 to the video buffer 2 (FIG. 1). The first scan word is fetched and placed in the shift register 48. The size of a scanned word is 16 digital bits. Of course, any other size scanned word may be used without departing from the scope of the present invention. The shift register 48 is a conventional shift register having a data output on conductor 724 and a controlled input identified as fast bit clock line 56. The fast bit clock line 56 shifts the shift register 48 simultaneously with incrementing the word counter 58. As each digital "1" bit is shifted out of the shift register 48, it is combined with the fast bit clock line 56 through logical (AND) circuit means 50. The output from AND circuit means 50 is fed over conductor 726 and increments the horizontal histogram counter 52. As such, for each digital "1" bit in the video buffer 2 (FIG. 1), the horizontal histogram counter 52 is incremented by one. When the word counter 58 overflows, this indicates that the word in shift register 48 has been completely shifted. The sector size counter 60 is decremented by a digital "1" and the video buffer address counter 46 is incremented to point to the next video scan word.

The word now residing in the video buffer 2 at the current address of the video buffer address counter is then fetched and the shift process is repeated again. The shift process is repeated as above until the sector size counter 60 goes to zero, indicating the end of the sector. The value in the horizontal histogram counter 52 is stored in the horizontal histogram buffer 6 (FIG. 1) at the address in the horizontal histogram buffer address counter 54. The sector size counter 60 is then reloaded with the value in the sector size register 62. The horizontal histogram buffer address counter 54 is incremented by one and the horizontal histogram counter 52 is cleared for the next histogram of the current sector.

It is worthwhile noting at this point that each sector contains a predetermined number of words. Therefore by transferring the data from the video buffer 2 on a word basis into the shift register 48, and keeping track of the number of words processed, or decrementing the sector size counts 60 as a word is processed, the horizontal histogram (that is black PEL or bits count for a specific sector) can be accurately determined.

The entire above-described process is repeated until a stop signal is outputted on conductor 64. The signal is generated by an overflow (from bit 9) of the video buffer address counter 46. The stop signal is transmitted over the microprocessor bus 34 to the microprocessor 26. The microprocessor 26 may at this time, reinitialize the registers and counters for another scan line; or if this is the last scan line for a line of data on the original scanned document, the microprocessor 26 will start (that is initiate) the operation of the find baseline unit.

Find Baseline Unit

The find baseline unit defines a line representing the baseline of a row of characters. As stated previously, the baseline is an imaginary line on which all nondescenders of alpha numeric characters rest or lie. FIG. 3A shows a graphical representation for baseline examples. For each line of data, the baseline is the horizontal line running across the page. As will be shown later, the baseline is useful in the segmentation process, the finding of underscores, and the separation of print lines. The distinguishing feature of the baseline is a large drop in the number of black PELs in the horizontal histogram of the character boxes of most characters. In the case of most characters, there is a drop to zero at the baseline. However, even for several of the descenders, this drop is still significant. In searching for this feature in the video buffer 2 (FIG. 1), the concept of a window of search is used. Window of search limits the region of the character boxes that is searched for the baseline. The drop in the horizontal histograms (characteristic of the baseline search) is done within this window. The windows of search are actually overlaid to sections or sectors of the video buffer. The video buffer is segmented into a plurality of sectors. The window of search is placed in each sector individually. The actual placement of these windows of search is done in one of two ways. By way of example, and in relationship with FIG. 3A, if a baseline is known for a previous row of characters such as baseline 726, a relatively large window of search, say 10 PELs wide at 240 PELs/inch is centered over the region predicted by the old baseline for this sector. Turning to FIG. 3B for the moment, the window of search 728 is positioned relative to a previous baseline. The span of the window of search 728 includes two half indices. An indices is defined as the spacing between two adjacent lines of characters on the page. The region is then seached for horizontal PEL line which fulfills a criteria of baseline. This criteria will be described shortly hereinafter. If the previous baseline cannot be used as a guess for the new baseline, another procedure to place the window of search is used. For this procedure, the top of the black in the sector is found. Using this as a starting point, several guesses are made about the character, with relatively narrow window of search. By way of example, three PELs at 240 PELs/inch seem to be adequate. The window is centered about each guess. FIG. 3C shows a graphical representation of the process used to determine the baseline knowing the top of a character.

For each placement of the window of search, the region defined by the window is searched for a baseline. This is detected by searching for a substantial drop in the number of black PELs from the maximum above the PEL line and the consideration in the window. The drop is measured against the drop needed to define a baseline (this "threshold" is a parameter of the algorithm and is defined as a ratio of number of PELs in baseline/number of PELs in maximum). If no horizontal scan within the sector meets the criteria in the window of search, or for any other successional windows of search for the no previous guess case, then no baseline value is found for the sector.

After each sector of the video buffer has been examined for a valid baseline, the values found are then examined to see if they fit the surrounding values. This is done by comparing each sector value with the two closest valid baseline values. If this value is greater than or less than the two adjoining values by a predetermined amount, it is eliminated from further consideration.

FIG. 3D is a graphical representation of sectored baseline. Note that the eliminated values deviate from the adjoining two values, and as such, these baseline values are eliminated from further consideration. It is worthwhile noting that the value under test must deviate from both surrounding values by the margin for error and must miss the same direction. By way of example, if the margin for error was a numeral 1 in the segmented baseline values of 25, 23 and 25, then 23 would be eliminated. However, if the reading was 25, 23 and 21, it would not be disregarded.

The values remaining after this elimination are correlated using some curve matching technique such as the least square regression, etc. The use of curve matching technique for piecing segments of a straight line are well known, and therefore details will not be given here. Using the correlation of baseline value for each sector, the baseline for a complete line is calculated.

Figure 3:
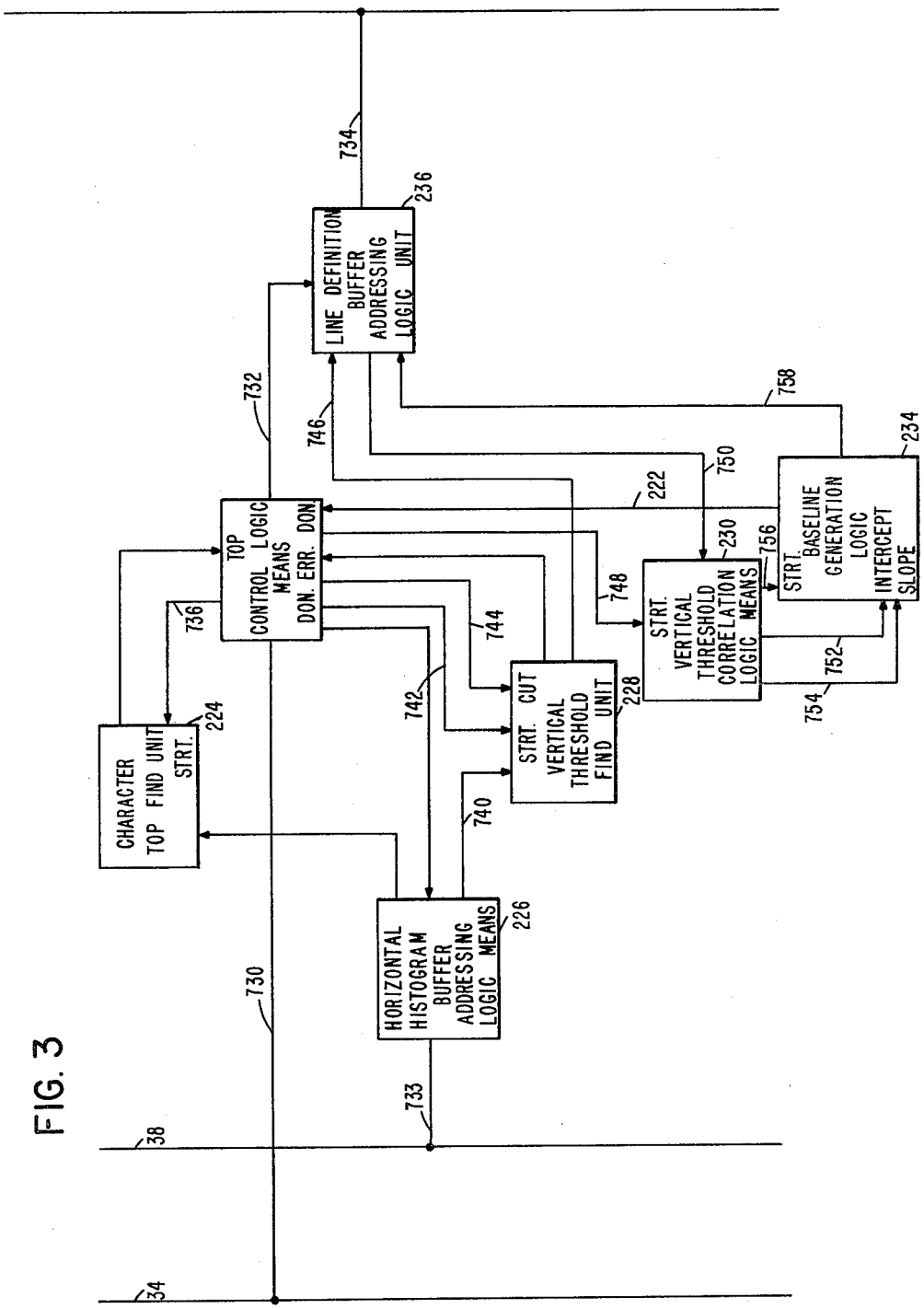
FIG. 3 shows a block diagram of the functional components of the find baseline unit.
Figure 3A:
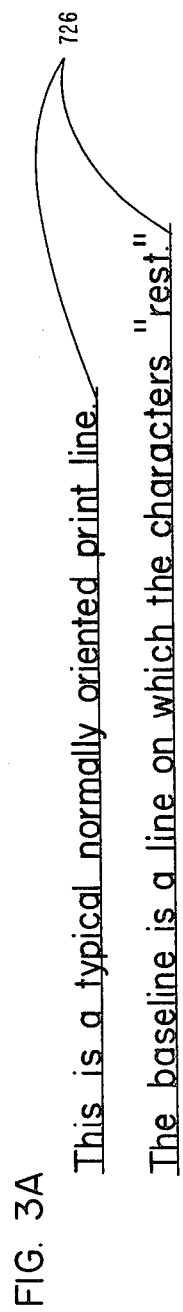
FIG. 3A shows a graphical representation for the baselines.
Figure 3B:
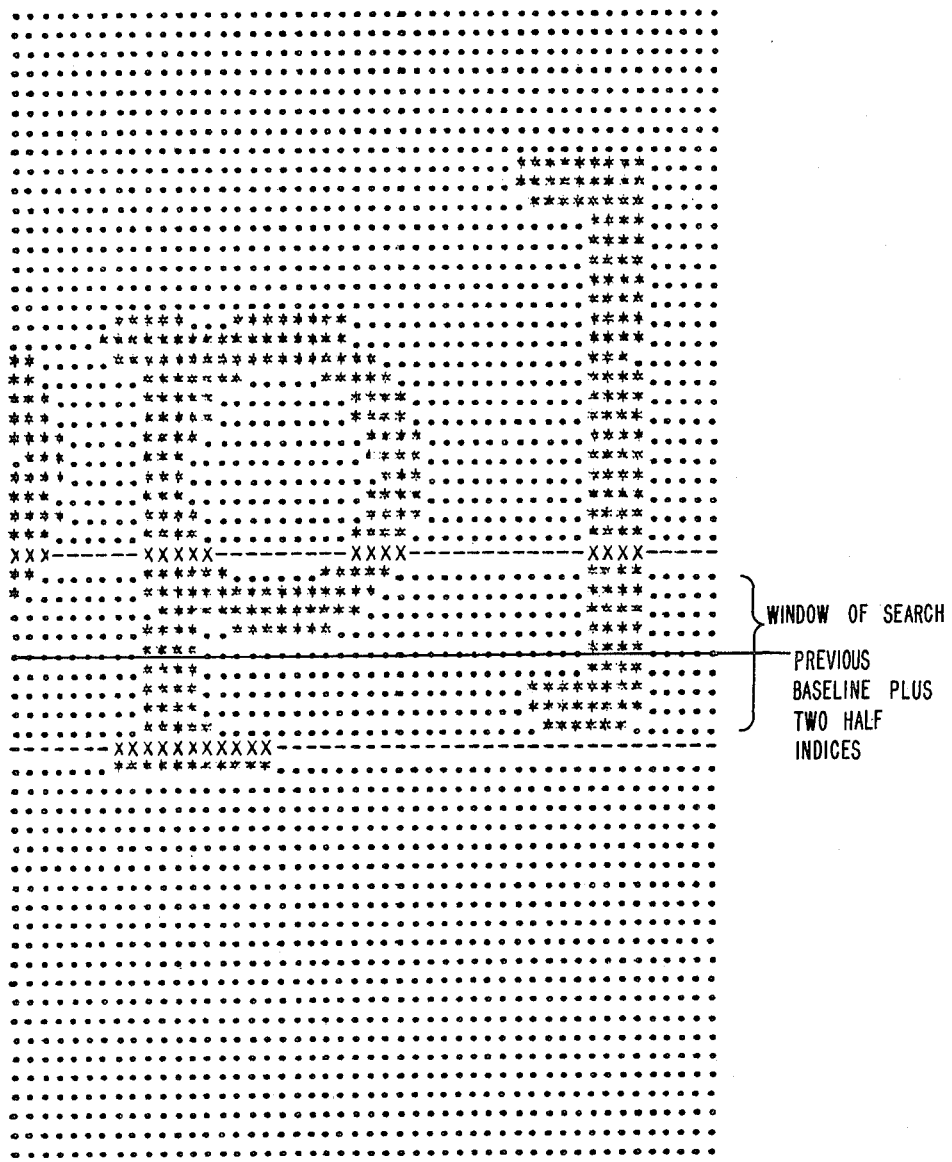
FIG. 3B shows a graphical representation of the "window" of search positioned relative to a known baseline.
Figure 3C:
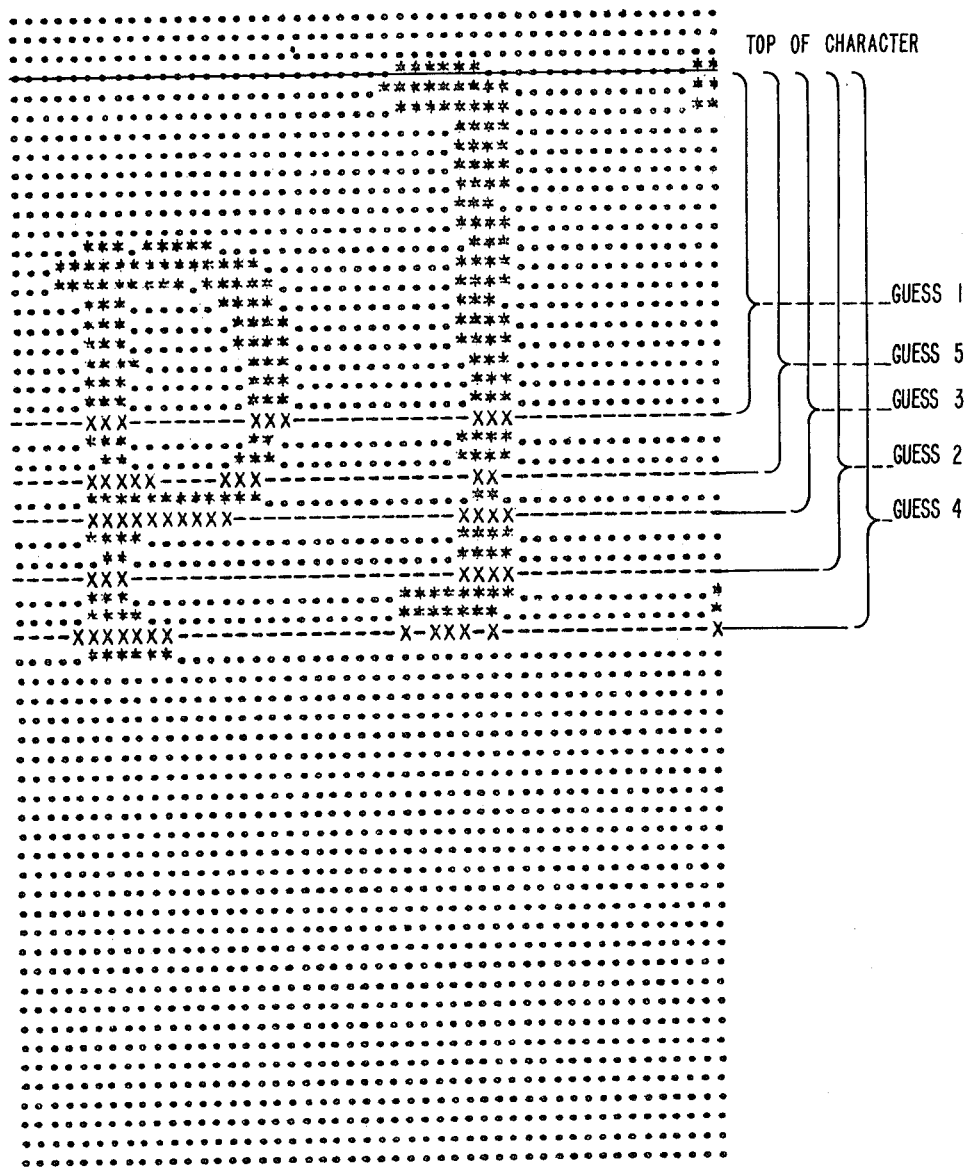
FIG. 3C shows a graphical representation of the "window" of search positioned relative to the top of a character.

FIG. 3 is a figure of the functional components of the find baseline unit 8 (FIG. 1). This unit determines the baseline of the line of data currently occupying the video buffer 2 (FIG. 1). This is done by examining the data in the horizontal histogram buffer 6 (FIG. 1) and the line definition buffer 12 (FIG. 1). The result of the operation is outputted to the line definition buffer 12.

The find baseline unit 8 includes a control logic means 222. The control logic means is coupled by conductor 730 to microprocessor bus 34. Line definition buffer addressing logic unit 236 is coupled to the control logic means over conductor 732. The line definition buffer address logic 236 is coupled by conductor 734 to line definition buffer bus 42. The line definition buffer addressing logic 236 interrogates the control logic means 222 to obtain addresses at which data can be removed and stored.

To this end, the microprocessor 26 (FIG. 1) starts a find baseline operation by signalling the address of the find baseline unit 8 (FIG. 1) on the microprocessor bus 34. The control logic means 222 decodes the address and loads an address into the line definition buffer addressing logic unit 236. The baseline information for the sector stored at the given address is fetched by the line definition buffer address logic unit. The baseline value is tested by the control logic means 222. If the value is zero, the control logic 222 sets the address of the sector in the horizontal histogram buffer address logic means 226. The horizontal histogram buffer addressing logic means 226 is coupled over conductor 733 to the horizontal histogram buffer bus 38. The address which is set in the horizontal histogram buffer address logic means 226 by the control logic means 222 is the address of the top histogram for the current sector. Simultaneously with loading the address in the horizontal histogram buffer addressing logic 226, the control logic means 222 gives an enabling signal to the character top find unit 224 over conductor 736. The function of the character top find unit 224 is to find the top of the characters in the sector. The character top find unit 224 is coupled over conductor 738 to the horizontal histogram buffer addressing logic means 226. Beginning at the address loaded in the horizontal histogram buffer addressing logic 226, the character top find unit 224 fetches the horizontal histograms of the current sector until either all the histograms for the current sector are fetched or a nonzero histogram is encountered. In the preferred embodiment of this invention, the sector has 32 scans. The resulting value found (zero or nonzero histograms) is loaded into the control logic means 222.

Still referring to FIG. 3, if the original baseline value fetched by the line definition buffer addressing logic unit 236 was nonzero or the character top find unit 224 returned a nonzero, then the control logic 222 formulates an address for the horizontal histogram addressing logic 226. It also sets the line definition buffer address logic unit 236 to point to the address of the current sector baseline value. The control logic 222 then enables or starts the vertical threshold find unit 228. The vertical threshold find unit is connected to the horizontal histogram buffer address logic, the control logic means 222, and the line definition buffer addressing unit 236 over conductors 740, 742, 744, and 746 respectively. The vertical threshold find unit 228 searches a window of histograms starting at the address in the horizontal histogram buffer addressing logic means 226 until it either finds a large drop in the histograms of the current search (to ¼ of a previous value in the search for this embodiment) or until the count of histograms loaded from the control logic 222 is exhausted. If a large drop is found, the PEL row number (formulated by shifting the horizontal histogram address) is written in the line definition buffer 12 (FIG. 1).

Still referring to FIG. 3, if no previous baseline is known for the sector, the control logic means 222 will attempt to find the baseline in several different windows in the sector. In the preferred embodiment of this invention, the windows are approximately three PELs wide and their location is based on the top of the character found earlier by the character top find unit 224. In the preferred embodiment of this invention, the windows are searched on centers 18, 26, 23, 29, 21, and 15 PELs from the top. These correspond to typical distances from the top of characters to their baselines for various size characters in fonts of interest. Of course other values may be used without departing from the scope of this invention. The values are used beginning from the top of the character towards the bottom looking for a large drop in the horizontal histogram or until the list is exhausted. After failure to find a large drop in any of the windows, the find baseline unit 8 will continue to the next sector. If a previous baseline is known, only one relatively large window is used to search for a baseline for the sector. In the preferred embodiment of this invention, this window is 8 PELs wide and is centered on where the baseline can be expected to lie, based on the previous baseline. Failure of the threshold find unit in this case is ignored, and the control logic proceeds to the next sector. The above-described process of finding the baseline for each individual sector is repeated for all 32 sectors of the video buffer 2 (FIG. 1). When all the sectors have been processed, the resulting data must be further processed to find one baseline for the line of data in the video buffer.

To this end the control logic means 222 sets the address of the first sector's baseline value in the line definition buffer addressing logic unit 236 and starts the vertical threshold correlation logic means 230. The vertical threshold correlation logic means is connected to the control logic means 222 and the line definition address logic unit 236 over conductors 748 and 750, respectively. The vertical threshold correlation logic means 230 includes combinatorial logic which examines the baseline value for each sector and eliminates from consideration those values which vary more than three raster scans in either direction (that is up or down) from two adjacent or surrounding nonzero values. The deviation should be in the same direction. In other words, for any value to be eliminated, it must either be three PELs above or below both of the surrounding nonzero baseline values. With the remaining values, the vertical threshold correlation logic means performs a conventional least square linear regression and obtains a left margin intercept and a sector increment or decrement for the video buffer baseline. The calculated values are then passed over intercept conductor 752 and slope conductor 754 to baseline generation logic 234. The baseline generation logic 234 is enabled by a control signal from the vertical threshold correlation logic means 230 over conductor 756 and its output is fed over conductor 758 to the line definition buffer address logic unit 236. The baseline generation logic 234 uses these values to generate the baseline value for each sector and writes these values via line definition buffer addressing logic unit 236 into the line definition buffer 12 (FIG. 1). The vertical threshold correlation logic means 230 and the baseline generation logic means 234, both use fractional scan values (8 bits right of the decimal point) to define the increment or decrement and compute the base value for each sector. These baseline values are then truncated to integers for storing. This completes the find baseline operation and the microprocessor is informed accordingly.

Find Underscore Unit

FIG. 4 shows, in block diagram form, the details of the find underscore unit 10 (FIG. 1). The find underscore unit determines the location of the underscore characters in the line currently occupying the raster scan video buffer 2 (FIG. 1) by examining the baseline information for each sector in the line definition buffer 12 (FIG. 1) and the horizontal histogram buffer 6 (FIG. 1). The result of this operation is stored in the line definition buffer 12. The control logic means 242 is connected over conductor 755 to the microprocessor bus 34. Conductor 757 interconnects the control logic means to the line definition buffer address logic means 244. The output from the line definition buffer addressing logic means 244 is connected to line buffer definition bus 42 by conductor 760. As was stated previously, the microprocessor 26 controls the overall operation of the segmenting device. To this end, the microprocessor starts the operation (that is find underscore) by outputting the address of the find underscore unit 10 (FIG. 1) on the microprocessor bus 34. The control logic means 242 decodes the address for the find underscore unit 10 and reads the baseline value for the first sector from the line definition buffer 12 (FIG. 1). The control logic means 242 then examines the horizontal histograms in a "window" defined in accordance with the baseline value. The window defined is referenced from the known baseline value. In the preferred embodiment of this invention, the top of the window begins at five scans below the baseline and is eight scans deep. Of course other window-defining characteristics can be defined without departing from the spirit and scope of the present invention. The control logic processes the histograms in this window in the following way:

1. If black exists only on the top and bottom margin and does not extend further than three PELs into the window from either margin, there is no underscore in the sector.
2. If black is totally isolated by white from the top and bottom margins, then that is the underscore and no further processing is needed.
3. If black is found in the middle of the window, touched from either the top or bottom, or both, the vertical threshold find unit 250 (FIG. 4) is used to isolate the underscore. The vertical threshold find unit 250 is connected to the control logic means 242, line definition buffer addressing logic means 244 and the horizontal histogram buffer addressing logic 246 by conductors 762, 764, 766, 768, and 770 respectively. The function of the vertical threshold find unit 250 is to search for the top or bottom of the underscore under the control of the control logic means 242. The search routine begins at a position determined by the control logic means 242. The search begins at the maximum horizontal histogram in the window. The position where the search begins is communicated from the control logic means 242 by setting the address in the horizontal histogram buffer addressing logic 246. The horizontal histogram buffer addressing logic 246 is connected by conductor 772 to the horizontal histogram buffer bus 38. As the vertical threshold find unit 250 needs additional data, the control logic means 242 causes the horizontal histogram addressing logic 246 to increment or decrement its address as is needed. The operations continue until either the count from the control logic means 242 is exhausted or the large drop which defines threshold is found. This drop consists of a histogram ¼ as large as the previously seen histogram in the area processed. The output of the above operations, either the control logic 242 determinations or the output of the vertical threshold unit 250, is stored in line definition buffer 12. The value stored is zero for the top and bottom if no underscore is found for the region. If no significantly large drop is in the vertical threshold unit 250, the window margin is stored. After all the sectors have been processed in accordance with the previously described find underscore process, the control logic 242 signals the microprocessor 26 that the vertical histogram unit 14 (FIG. 1) should be started to calculate the histograms in the region specified by the underscore top and bottom values in the line definition buffer 12. The vertical histogram is the number of black bits in a vertical scan. It should be noted that where no underscore exists, the values in the line definition buffer 12 will be zero so no vertical histogram operation is performed.

When the vertical histogram unit 14 (FIG. 1) has completed, the microprocessor 26 again starts the control logic 242 by gating the address to be decoded on the microprocessor bus 34. The control logic means 242 loads the vertical histogram buffer addressing logic 248 with the start of the histogram's address and loads the line definition buffer addressing logic 244 with the address of the underscore horizontal limit definition area. The horizontal limit find unit 252 is then started over conductor 774 by the control logic means 242. The horizontal limit find unit 252 writes a bit to the underscore definition area of the line definition buffer 12 for every PEL in a scan. The bit is the zero/nonzero state of the vertical histogram data of the vertical histogram buffer 16. This data will be examined by the set bits hardware 270 (FIG. 9) while the characters are being segmented to determine if the characters were underscored. The detail of the set bits hardware will be described hereinafter.

Vertical Histogram Unit

Figure 5:
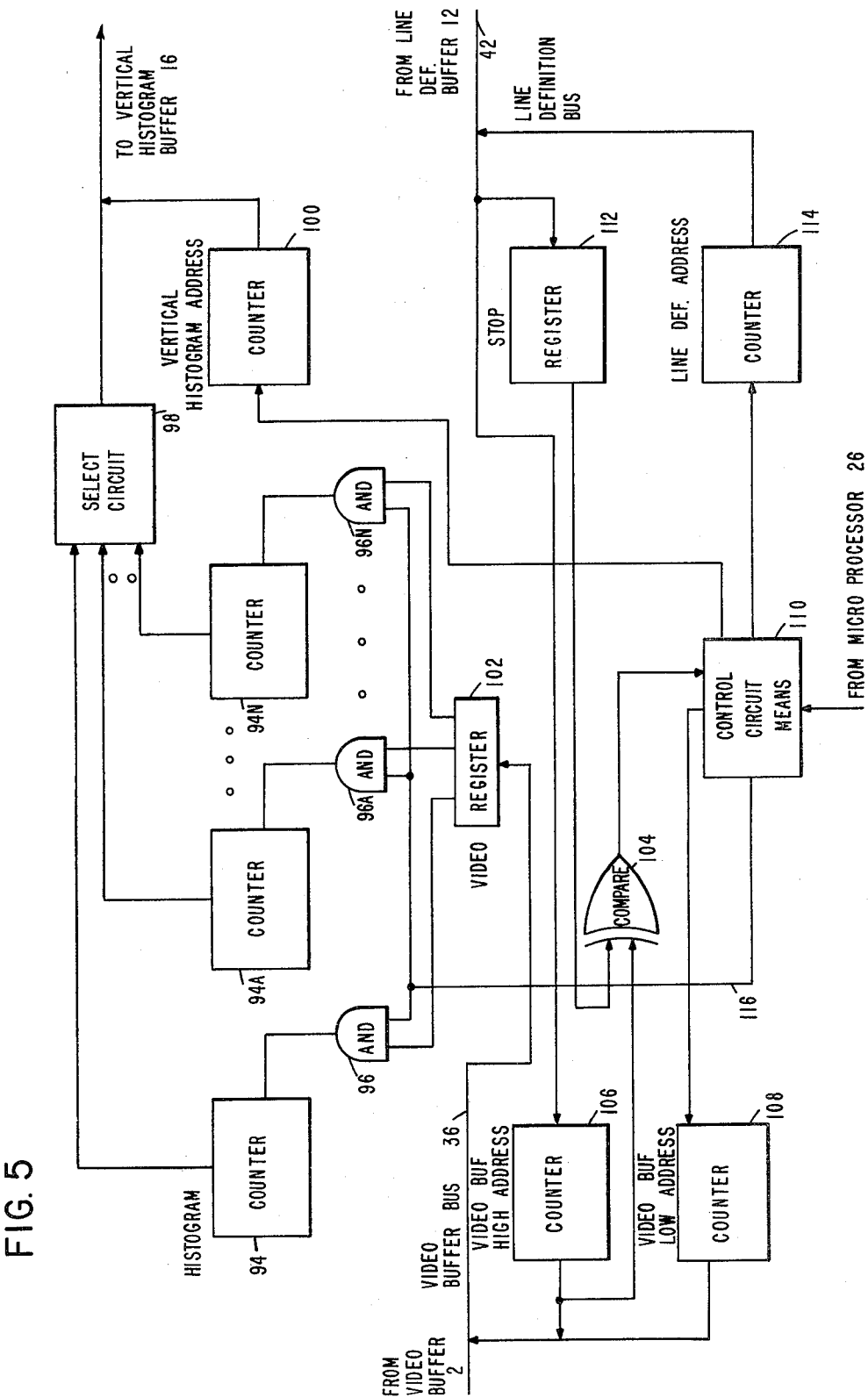
FIG. 5 shows a functional block diagram of the vertical histogram unit.

Turning now to FIG. 5, a schematic of the circuits for the vertical histogram unit 14 (FIG. 1) is shown. The vertical histogram unit 14 calculates vertical histogram for data in the video buffer 2 using boundary ranges stored in the line definition buffer 12. The vertical histogram unit 14 includes control circuit means 110 which is coupled to the microprocessor bus 34. The control circuit means 110 constantly monitors the microprocessor bus, and on finding its address on the microprocessor bus, clears the vertical histogram address counter 100, the line definition address counter 114, a plurality of vertical histogram counters 94, 94A, ... 94N, and the video buffer low address counter 108. The control circuit means 110 interrogates the line definition buffer 12 (FIG. 1) and fetches the start scan number from said definition buffer over the line definition bus 42. The address from which the start scan number is chosen is stored in the line definition counter 114. The start scan number is placed in the video buffer high address counter 106. The line definition address counter 114 is incremented and the next word (the ending scan number) is fetched from the line definition buffer 12. The word is placed in the stop register 112.

The raster scan word is fetched from the video buffer 2 (FIG. 1) over the video buffer bus 36. The video buffer high and low address counters 106 and 108 respectively are used for the address. The word is placed in the video register 102. The video register 102 is connected to a plurality of AND gates 96, 96A ... 96N. The AND gates, in turn, are connected to a plurality of histogram counters 94, 94A ... 94N. The number of counters and corresponding AND gates is equal to the width of the video register 102 in bits which is equal to the word size of the video buffer 2. In the preferred embodiment of this invention, the word size is 16 bits. A control pulse input on conductor 116 is sent from the control logic 110 to the AND gates 96. If the corresponding bit in the video register 102 is a one (black) then the pulse will be enabled through the corresponding AND gates and increment the corresponding histogram counter. In this way the number of black bits in each vertical column of the video buffer 2 is accumulated.

After each word is fetched from the video buffer 2, the video buffer high address counter 106 is incremented. Because the number of bits per scan is a power of two (in this embodiment 256), this has the effect of moving down in a vertical column. The new word fetched is placed in the video register 102 and the histogram counters are incremented as above. The new contents of the video buffer high address counter 106 are compared in the compare circuit 104 with the contents of stop register 112. If they are equal, the control logic 110 knows to move to the next vertical column. When the video buffer high address counter 106 equals the stop register 112, the control logic 110 causes the following:

1. The counts contained in the histogram counters 94 are stored in the vertical histogram buffer 16 (FIG. 1). Each counter is, in turn, selected through the select circuit 98 to be stored in the buffer at the address in the vertical histogram counter 100. As each count is stored, the vertical histogram counter 100 is incremented by one. This process continues until all the histogram counters 94 through 94N have been stored.
2. After step 1, the histogram counters 94 through 94N are cleared to zero.
3. The video buffer low address counter 108 is incremented by one. This will cause the next vertical column to be addressed in the video buffer 2.
4. The video buffer high address counter 106 is reloaded with the start scan number from the line definition buffer 12.

If a low order bit of the low address counter 108 overflows, that indicates the end of video sector. The control logic 110 then causes the next start and end words of that sector to be fetched from the line definition buffer 12 in the same manner as previously described.

If the highest order bit of the low address counter 108 overflows, that indicates the end of the operation and the control logic 110 signals completion of the operation to the microprocessor 26 over the microprocessor bus 34.

FInd Pitch Unit

Figure 6:
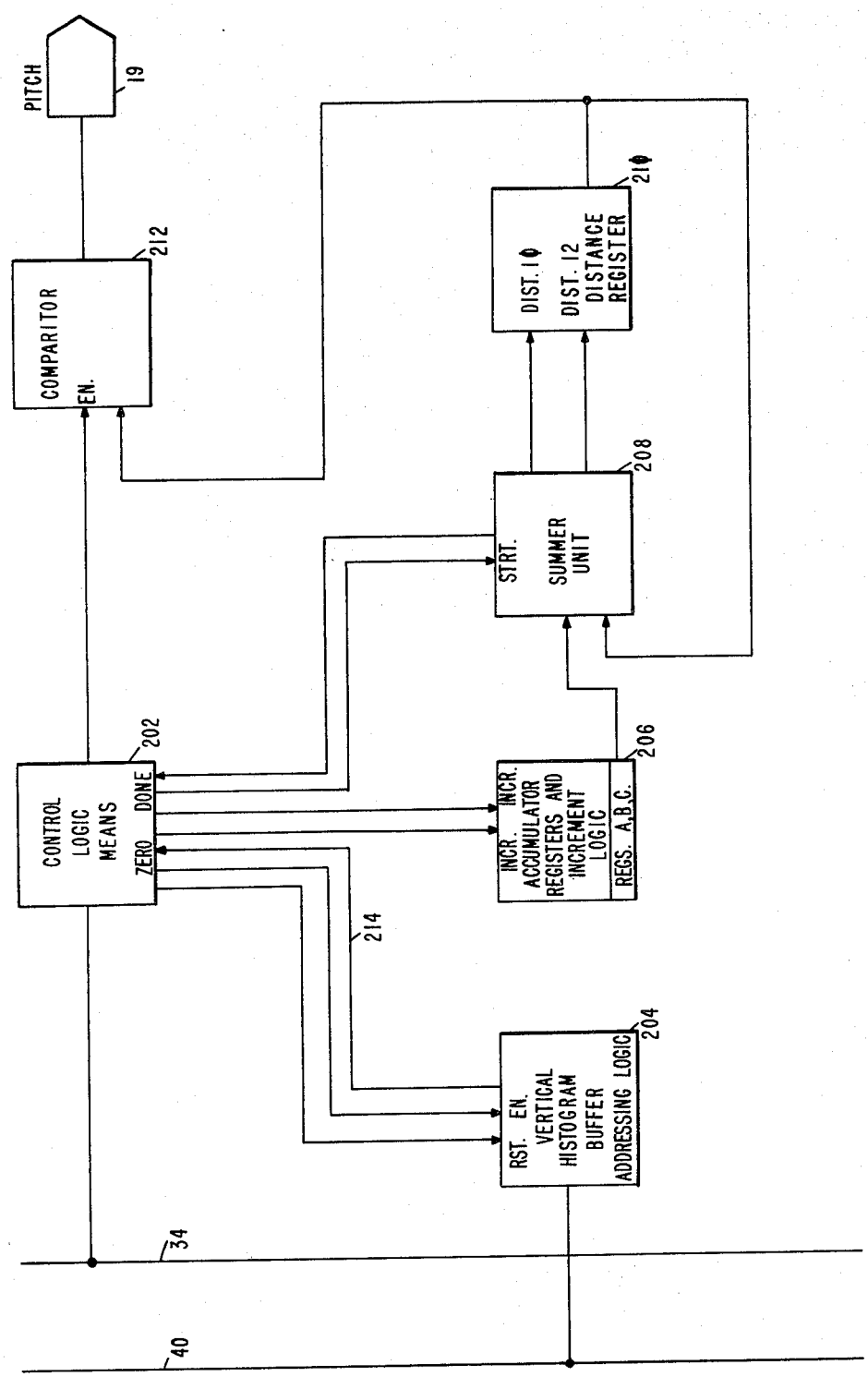
FIG. 6 shows a schematic of the functional components of the fine pitch unit.

FIG. 6 is a figure of the functional components of the find pitch unit 18 of FIG. 1. The unit determines the pitch of the line of data currently occupying the raster scan video buffer 2 (FIG. 1) by examining the data in the vertical histogram buffer 16. The result of the operation is outputted on the pitch line 19 to the find word unit 20.

The find pitch unit includes a control logic means 202. The control logic means 202 accepts control information from the microprocessor over microprocessor bus 34 and controls the vertical histogram buffer address logic 204, accumulator registers and increment logic 206, summer unit 208, distance register 210 and comparator 212. These last enumerated units are all coupled by conductors to the control logic means 202. Before describing the operation of pitch control unit, the following definitions will be given: the pitch may be 10 or 12 characters per inch, which is 20 or 24 PELs per character at 240 PELs per inch resolution. As is used herein, the word pitch means the horizontal distance between the vertical center line of adjacent characters.

The control logic means 202 monitors the microprocessor bus 34 and on decoding its address from the bus, the control logic 202 resets the distance registers 210, resets the A, B and C registers of the accumulator register and increment logic 206, sets the address in the vertical histogram buffer address logic 204 and starts the vertical histogram buffer address logic 204. The vertical histogram buffer address logic 204 is coupled to the vertical histogram buffer bus 40. The unit fetches the histogram information from the vertical histogram buffer 16 and tests each histogram for the zero/nonzero state. The result of this test is transmitted to the control logic 202 via the zero control line 214.

When the control logic 202 receives this signal from the addressing logic 204, it determines the operation to be performed on the basis of this information and the state of its logic. If the zero line 214 indicates that the data is nonzero, then the accumulator registers and increment logic 206 is signalled to increment register C of its registers. This indicates that the current black run is continuing and no further action is necessary. If the zero line 214 indicates that the histogram is zero and the previous histogram was zero, then register B of the accumulator register increment logic 206 is incremented. If the zero line 214 indicates that the histogram is zero and the previous histogram was not zero, control logic 202 must process the completed black image run. The control logic disables the vertical histogram addressing logic 204 and starts the summer unit 208. This unit calculates two sums on the basis of the contents of the accumulator register 206. These sums are:

New distance $10 = A + B + C/2 + 24 + $ distance 10
New distance $12 = A + B + C/2 + 20 + $ distance 12 where distance 10 and distance 12 are the names of the distance register 210.

Where A = contents of A register which holds ½ of the previous black run.

B = contents of the B register which holds the previous white run length.

C = contents of the C register which is the current black run length.

The summer unit 208 now checks the contents of the accumulator register A. If the content is zero, the summer performs no operation. This action handles the left margin of the line. The summer unit 208 also checks the intermediate sum $A + B + C/2$. If this number is less than 16 or greater than 28, the summer performs no operation. In any other case, the resulting new distance 10 and new distance 12 are stored in the distance register 210. Now the control logic 202 is signalled that the sum unit 208 is done, control logic 202 reenables the vertical histogram buffer 204 and signals the accumulator register and increment logic 206 to store register C/2 into register A and to reset register C. The above operations continue until the end of the histogram data is reached. The control logic 202 then disables the vertical histogram buffer addressing logic 204 and starts the distance compare logic 212. This logic reads the distance register 210 and compares them. The comparison determines the pitch as follows. The pitch indicated will be ten unless distance 12 register is less than the distance 10 register. This implies that if no valid data is found, the pitch will default at ten since both distance registers will be zero.

Find Word Unit

Figure 7:
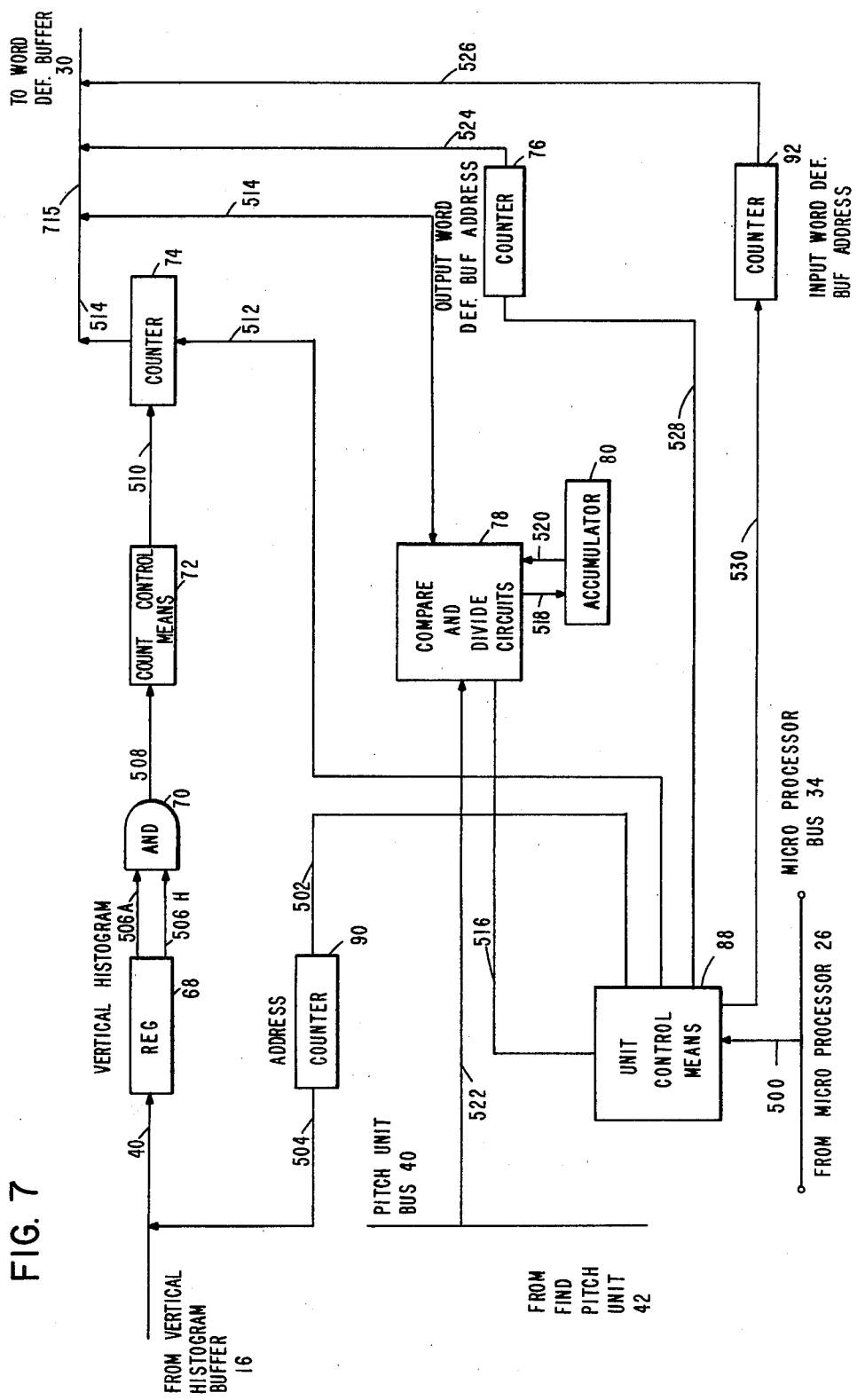
FIG. 7 shows a schematic of the find word unit.

FIG. 7 shows a detailed block diagram of the find word unit of FIG. 1. The purpose of this unit is to find the location of data in the video buffer 2 (FIG. 1). With many printers which do right margin justification, the spaces between words do not have to be integral pitch units. Because of this characteristic, the need for finding word spaces becomes necessary. The find word unit includes a unit control means 88. The unit control means 88 is connected to microprocessor bus 34 over conductor 500. As will be explained subsequently, under the control of the microprocessor 26, the control unit means is activated. After activation, the unit control means generates control information to the various components of the find word unit so that the boundaries for the words in a line of information in the video buffer 2 (FIG. 1) are ascertained. The unit control means 88 is connected by conductor 502 to vertical histogram address counter 90. The vertical histogram address counter 90 is connected by conductor 504 to the vertical histogram buffer bus 40. As will be explained hereinafter, an address at which vertical histogram information is to be accessed in the vertical histogram buffer 16 (FIG. 1) is outputted on conductor 504 from the address counter. The information from the vertical histogram buffer 16 is transmitted over the vertical histogram buffer bus 40 into the vertical histogram register 68. The vertical histogram register 68 is an eight-bit register. Each of the output stages of the register is connected by conductors 506A through 506H to the input of AND circuit means 70. As will be explained hereinafter, the function of the AND circuit means 70 is to monitor the output from vertical histogram register 68 and to determine the number of consecutive nonzero vertical histograms and zero vertical histograms. Also the compare and divide circuit 78 is connected to pitch unit bus 40 over conductor 522. Two counters identified as output word definition buffer address counter 76 and input word definition buffer address counter 92 are coupled to the word definition buffer bus 715 by conductor 524 and 526 respectively. The counters keep track of addresses in the word definition buffer where data is stored and retrieved in order to calculate the projection and the word spaces between a line of data in the video buffer 2 (FIG. 1). The counters are coupled to the unit control means 88 over conductors 528 and 530 respectively. As was stated previously, the function of the find word unit is to find the word separation in a line of data in the video buffer and load the coordinates of said word in the word definition buffer. To this end, the apparatus finds the projection associated with each character. The white space associated between each projection is also ascertained. Both the projection information and white space information are temporarily loaded in the word definition buffer. The projection is then forced or manipulated to extend on integral pitch boundaries. As is used herein, the "pitch" is defined to be the horizontal separation between the midpoints of adjacent characters. Any white space separating projection which is less than a predetermined value is ignored, and the word boundary is defined to be the horizontal distance including the projection and ignored white space.

In operation, the microprocessor 26 outputs an address for the find word unit 20 on microprocessor bus 34. The unit control means 88 recognizes this address and beings operation of segmenting the line of data in the video buffer. The information which is used by the find word unit is obtained from the vertical histogram buffer 16 (FIG. 1). As a preliminary process step to the find word operation, the unit control circuit 88 enables the vertical histogram address counter 90 to address the first word in the vertical histogram buffer 16. The unit control means 88 clears the projection counter 74 and sets the address in the output word definition buffer address counter 76 where the contents of the projection counter 74 should be stored in the word definition buffer 30 (FIG. 1). The unit control means 88 then causes the first word of the vertical histogram buffer 16 to be fetched and placed in the vertical histogram register 68. The word is processed by the AND gate 70 to see if it is all zero. If it is, the count control means 72 increments the projection counter 74. The unit control means 88 then causes the vertical histogram address counter 90 to be incremented, and the next vertical histogram is fetched from the vertical histogram buffer 16 and loaded into the vertical histogram register 68.

This process continues (that is fetching words from the vertical histogram buffer and testing for zero conditions) until AND gate 70 determines that the vertical histogram register 68 is not all zero. At that time, the value in the projection counter 74 is stored in the word definition buffer 30 (FIG. 1) at the location specified by the output word definition buffer address counter 76. The output word definition buffer address counter 76 is then incremented by the unit control means 88, and the projection counter 74 is set to a value of one by said unit control means. The process of counting nonzero vertical histograms in the vertical histogram register 68 will continue until the next zero vertical histogram is read. At that time, the number of nonzero vertical histograms (in the projection counter 74) will be stored in the word definition buffer 30. The process continues, that is alternating, counting zero then nonzero vertical histograms until the end of the vertical histogram buffer 16 is reached. The counts designating zero and nonzero vertical histograms which have been loaded in the word definition buffer 30 will be referred to hereinafter as "white projection" and "black projection". When the end of buffer 16 is reached, the unit control means 88 stores an "end of projection" marker value in the word definition buffer 30. The unit control 88 also sets the input word definition buffer address counter 92 to point to the beginning of the word definition buffer 30. It also sets the output word definition buffer address counter 76 to point to the second half of the word definition buffer 30.

The unit control means 88 fetches the first (white) projection from the word definition buffer 30 using the address stored in the word definition buffer address counter 92. The fetched information is stored in the accumulator 80. The input word definition buffer address counter 92 is then incremented by the unit control means 88. The next black projection is fetched from the word definition buffer 30. The black projection is loaded into the compare and divide circuit 78 where it is divided by the value of the pitch found on the pitch bus 40. The pitch is supplied from the find pitch unit 42. Depending on the remainder of the divide operation, one of three actions is now performed:

1. If the remainder is zero, the accumulator value and the black projection length are stored sequentially in the word definition buffer 30 based on the output word definition buffer address counter 76. As each value is stored, the counter 76 is incremented.
2. If the remainder is nonzero but less than a small number, in the preferred embodiment of this invention the small number is three, its value is subtracted from the black projection length. Half of its value is added to the accumulator (containing the white projection value) and the accumulator value and the new black projection value are sequentially stored as in Step 1 above. Also the next (projection) is fetched from the word definition buffer 30 at the address in the input word definition buffer address counter 92 added with half the value of the remainder, and placed in the accumulator 80.
3. If the remainder is nonzero but greater than or equal to the small number, the difference between it and the pitch value is added to the black projection length. Also, half of this difference is subtracted from the value in the accumulator and from the next white projection fetched as in Step 2 above. The new contents of accumulator 80 and the new black projection length are stored sequentially in the word definition buffer in the manner described in Step 1, and the modified next white projection becomes the new accumulator 80 as described in Step 2. This operation will be repeated for each pair of white and black projections until the end of projection marker is reach. As can be seen, the effect of this operation is to force the black projections in the word definition buffer to be multiples of the pitch width, subtracting from white space, half on one side and half on the other, as necessary, to do this.

Some white or black projections may become zero or negative as a result of this operation. The next step is to eliminate those zero or negative projections from the word definition buffer 30 and "merge" neighboring projections to them. This is done by fetching the first projection into the accumulator 80 incrementing the input word definition buffer address counter 92 to point to the next projection, and fetching that into the compare and divide circuits 78. The compare and divide circuits 78 determine if the projection is negative or zero. Based on that determination, one of two actions are taken:

1. If it is negative or zero, it is added to the accumulator 80; the next projection is added to the accumulator 80 and the next projection after that is examined as above. If it is positive, the accumulator 80 value is stored in the first part of the word definition buffer 30 using the output address counter 76 for addressing, and the next projection is placed in the accumulator 80.
2. If no negative projections were found, the process is essentially done. If some were found, however, the step starting with the divide and remainder operation previously described above, is repeated and should be repeated until no negative projections are found in the "merge" process.

Before the microprocessor 26 is signalled of the completion of the operation by the unit control means 88, one final pass is made through the word definition buffer 30. After this pass, the word definition buffer contains the column in the video buffer 2 that each word begins on or the number of character spaces preceding the word. This is done by setting the output and input word definition buffer address counters 92 and 76 respectively, both at the point of the beginning of the buffer 30. The first projection is fetched using the input address counter 92 and placed in the accumulator 80. Then the compare and divide circuits 78 divides it by the pitch value on the pitch bus 40 and rounds it to the nearest integral value. This is stored back in the word definition buffer 30 using the output word definition address 92. Also, the accumulator 80 value is stored in the buffer 30. The process continues adding both white and black projections to the accumulator and dividing the white projections by pitch. The accumulator value is stored as above using the address counter 92. When the end of the projections are reached, the unit control 88 signals the microprocessor 26 that the find word unit 20 is completed.

Find Character Unit

Figure 8:
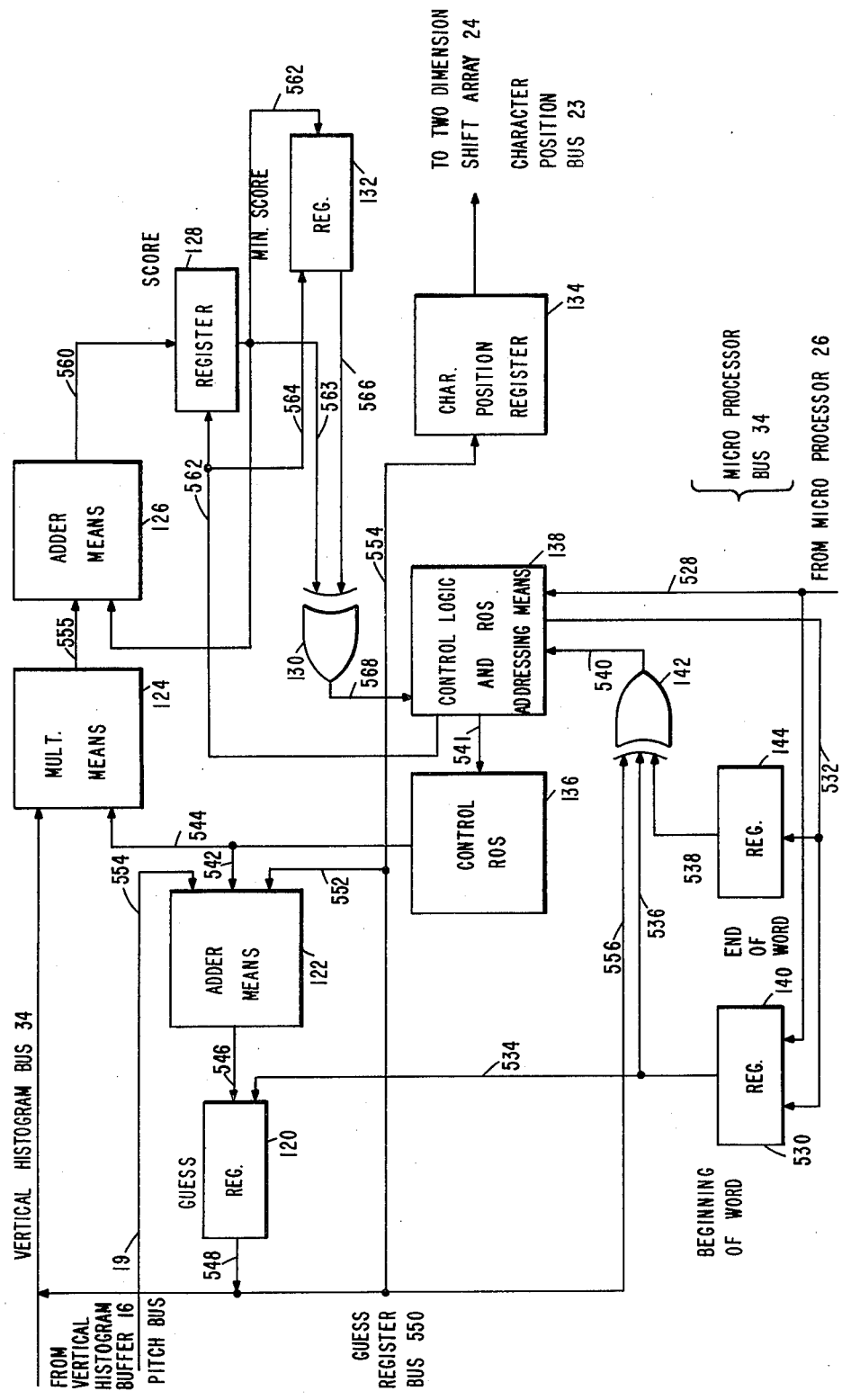
FIG. 8 shows a block diagram of the details of the find character unit.

Referring now to FIG. 8, the details of the find character unit 22 (FIG. 1) are shown. As was stated previously, the function of the find character unit is to locate the starting and ending columns of each character in the video buffer 2 (FIG. 1). The find character unit includes a control logic and read only storage (ROS) addressing means 138. The control logic and ROS addressing means 138 is connected to microprocessor bus 34 by conductor 528. The microprocessor bus 34 is also connected to the beginning of word register 140 and the end of word register 144 through conductors 530 and 532 respectively. As will be described hereinafter, the microprocessor 26 (FIG. 1) loads the beginning of word register and the end of word register with information relative to the beginning of a word and end of a word in the video buffer 2 (FIG. 1). The information which is loaded in the registers is obtained from the word definition buffer 30 (FIG. 1). As was described above relative to the find word unit 20, the find word unit finds the boundaries for each word in a line of data in the video buffer and loads the coordinates in the load definition buffer 30. The microprocessor loads the beginning of word information and the end of word information in registers 140 and 144 respectively. The output from the beginning of word register 140 is connected to guess register 120 and compare logic means 142 by conductor 534 and 536 respectively. The output from the end of word register 144 is connected by conductor 538 to compare logic means 142. The output from the compare logic means is fed over conductor 540 to the control logic and ROS addressing means 138. The control logic and ROS addressing means 138 is connected through conductor 541 to the control ROS 136. As will be explained subsequently, the control ROS 136 stores three calculated numbers at particular addresses. The numbers are added by adder means 122 to information contained in guess register 120 and the information is loaded into the guess register. To this end, the output from the control ROS 136 is fed over conductors 542 and 544 to the adder means 122 and the multiplying means 124, respectively. The output from adder means 122 is connected through conductor 546 to the guess register. The output from the guess register is connected to guess register bus 550 by conductor 548. Data is fed from guess register bus 550 over conductors 552, 554 and 556 to adder means 122, character position register 134, and compare circuit means 142, respectively. The output information from character position register 134 is fed over the character position bus 23 to the two-dimension shift address register 24 (FIG. 1). Data on pitch bus 19 is fed into adder means 122 through conductor 554. The vertical histogram bus 34 transmits information relative to the vertical histogram from the vertical histogram unit to multiply means 124. The output from the muliply means 124 is connected by conductor 555 to the input of adder means 16. Conductor 558 interconnects the output from minimum (MIN) score register 128 to one of the inputs of adder means 126. The output from adder means 126 is fed over conductor 560 to the input of score register 128. The output from score register 128 is also connected by conductor 562 to the input of minimum score register 132. The score register 128 and the minimum score register 132 are controlled by input information on conductors 561 and 564 from the control logic and ROS address means 138. The output from the score register 128 and the minimum score register 132 is fed over conductors 563 and 566 respectively into compare means 130. The output from the compare means 130 is fed over conductor 568 into control logic and ROS address means 138.

Still referring to FIG. 8, and as was stated previously, the function of the find character unit is to locate the starting and ending coordinates for each character in the line of data stored in the video buffer. The characters are found by utilizing the so-called "overlay segmentation template method." The theory of the template overlay process begins with the definition of the template. The template is an imaginary grid with vertical lines disposed or displaced at pitch width intervals. As was stated previously, pitch width is defined to be the distance between the center lines of adjoining characters. The center vertical line of the grid designates the prospective segmentation point. Outlying lines represent preceding or following segment points and are always one pitch length apart. These outlying lines have less weight than the central line in any segment point decision. The grid or template is used to find the best segment point for the character. The vertical histograms (collected for calculate pitch and also used by find word unit) along the template lines are weighted according to their position in the grid and summed to give a total figure of merit for the PEL column represented by the central lines. The entire template is then shifted in each direction several PELs. The column with the best figure of merit is then chosen as the segment point. The process is repeated until each character on the line is segmented. Two criterion are used to position the grid. If beginning the segmentation of a new word, the grid is positioned around the starting PEL position of that word. If within a word, the grid is positioned around the last segment point plus pitch. A word is considered segmented if the last segment point plus pitch is greater than the word length minus pitch divided by two.

In operation, the microprocessor 26 (FIG. 1) addresses the find character unit 22 over the microprocessor bus 34. The microprocessor loads the beginnning of word register 140 and the end of word register 144 and then signals the control logic means 138 to begin operation. The beginning of word register 140 and end of word register 144, respectively, marks the beginning column and ending column of the word respectively. The microprocessor determines the respective columns from the word definition buffer 30 (FIG. 1). As was stated previously, these values were calculated by the find word unit 20.

The control logic 138 then controls the beginning of word register 140 so that the value in said register is placed in the guess register 120. Then the value in the guess register 120 is placed in the character position register 134 to mark the beginning of the character.

The value in the guess register 120 is then added to the value of the pitch from the pitch bus 19 through adder means 122, and the result is placed back in guess register 120. This value is used as an address to address the vertical histogram buffer 16 (FIG. 1) over the vertical histogram bus 34. Therefore, the vertical histogram for the column that is pitch units from the beginning of the word is fetched. If this histogram is a zero (all white spaces) then the operation of the unit is completed and the guess register 120 value is placed in the character position register 134 marking the end of the character. The values in the character position registers 134 are communicated to the two-dimensional shift array 24 over the character position bus 23, and control logic 138 signals completion of the character segmenting process to the microprocessor 26.

If the vertical histogram is not zero, a quick search is made in the neighborhood of the guess column for a zero histogram. This is done using the control ROS 136. The control ROS contains displacement values which are added to the guess register 120 through the adder 122. In the preferred embodiment of this invention, the displacements are: +1, −2, +3, −4, +5 and −6. Of course it is within the skill of the art to use other displacement values without departing from the scope or spirit of the present invention. Each displacement is added, in turn, to the contents of the guess register 120, and the new value in the guess register is used to address the vertical histogram buffer 16 in the method previously described. If a zero vertical histogram is found, the unit completes operation as described above.

If after this process no "zero vertical histogram" is found, the characters are obviously touching, and a more complicated method must be used to find the best separation point. The control ROS 136 is again used. The section of the ROS which is now used contains information relative to displacements, weights, and an indication of the number of the pitch units to add or subtract. The operation proceeds as follows:

1. The control logic 138 initializes the score register 128 and sets the minimum score register 132 to its maximum value.
2. A displacement is added from the control ROS (read only storage) 136 to bring the value in the guess register 120 back to its original value. In other words, the contents of the guess register 120 is forced to be equal to the contents of the beginning of word register 140. In the preferred embodiment of this invention, the displacement value is +3.
2. A vertical histogram is fetched from the vertical histogram buffer 16. The value of the vertical histogram is multiplied by the weight from the control ROS 136 by the multiply means 124, added with the score register 128 through adder means 126, and the result is placed back in score register 128.
4. Now the pitch value from the pitch bus 19 is added to the guess register 120. The value in the guess register 120 is compared with the begin and end register 140 and 144 through the compare circuit means 142. If the value is less than the begin register 140 or greater than the end register 144, then the weight is forced to zero by the control logic 138. Otherwise, a new weight, stored in the control ROS 136, is used when the vertical histogram is fetched and multiplied as in step 3 above.
5. The histogram multiplied by the weight is added to the score register 128 as in step 3.
6. Under control of the control ROS 136, the steps starting with step 4 are repeated successively adding or subtracting pitch units or numbers of pitch units until character boundaries, both ahead of and behind the boundary in question, are examined and their weighted results are added to the score register 128. In this embodiment it has been found useful to weigh boundaries farther away, less. The weights used have been 1, 2, 4, 2, and 1 where the 4-weight is the weight of the boundary that is trying to be resolved and the other weights are the weights for the character boundaries ahead or behind that boundary.
7. After all the boundaries have been examined, the pitch value is successively added or subtracted from the guess register 120 to bring it back to its original value in step 2. Then, the score register 128 is compared with the value in the minimum score register 132 through the compare circuit 130. If it is less than the value, the contents of the guess register 120 is placed in the character position of register 134 to mark the end of the character.
8. A new displacement (from the control ROS 136) is now added to the guess register 120. The score register 132 is set to zero. The process repeats starting with step 3, until all such displacements in the neighborhood of the boundary have been tried. In this embodiment all displacements within −3 to +3 PELs are tried.

At the end of this process, the character position register 134 will contain the boundary guess that had the lowest weighted conflict score. The control unit 138 then signals completion to the microprocessor 26 over the microprocessor bus 34. The microprocessor 26 will start the two-dimension shift array 24 (FIG. 1). Upon completion of the unit and assuming that the end of the scanned line has not been reached, the microprocessor 26 will restart the find character unit 22 as previously described. However, if the next character is in the middle of the word, the begin and end registers 140 and 144 will not be changed, and the guess register 120 will be set with the best guess value from the previous operation.

Shift Array and Set Bit Logic

Figure 9:
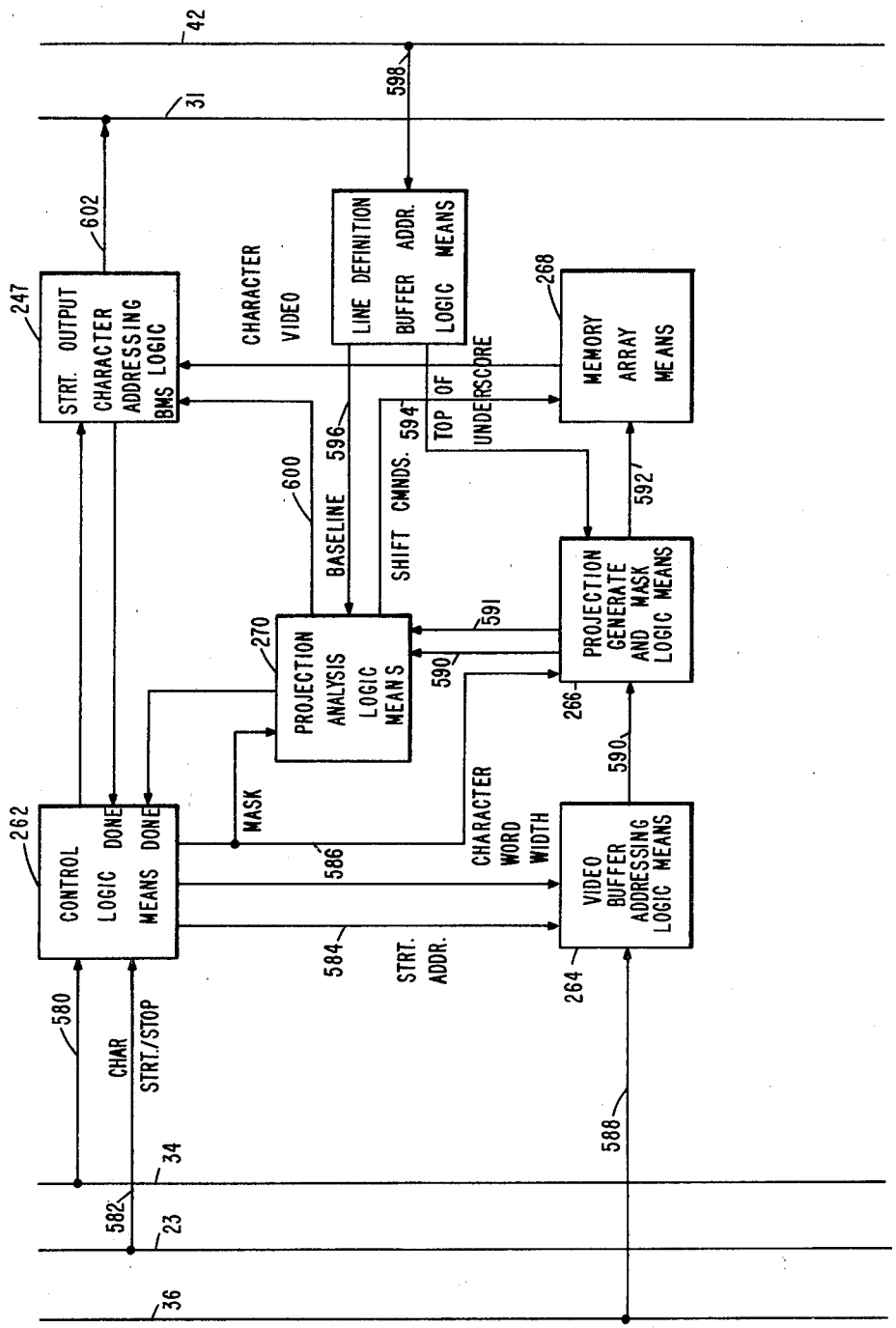
FIG. 9 shows, in block diagram form, the details of the functional components of the two-dimensional shift array and "set bits" logic.

FIG. 9 shows in more detail, the functional components of the two-dimensional shift array and set bits logic 24 (FIG. 1). The function of this unit is to center the characters (that is register) in the character boxes and to generate the above baseline, descender and underscore bits for the character recognition logic. The character recognition logic does not form part of this invention, and therefore will not be described in detail. Suffice it to say that in an OCR assembly, after the characters are segmented, they are passed on to the recognition logic for recognition.

The two-dimensional shift array and set bits logic 24 comprises of a control logic means 262. The control logic means 262 is connected to the microprocessor bus 34 by conductor 580. The control logic means 262 is also coupled to the find character unit bus 23 by conductor 582. A video buffer addressing logic means 264 is connected to the control logic means 262 over conductors 584 and 586 respectively. As will be explained subsequently, the control logic means loads the start address and the width for a character into the video buffer address logic means 264. The video buffer address logic means 264 is coupled to the video buffer bus 36 by conductor 588. Conductor 590 interconnects the video buffer addressing Logic means and the projection generate and mask logic means 266. The projection generate and mask logic means are coupled over conductor 592 to the memory array means 268. Conductors 590 and 591, respectively, interconnect the projection generate and mask logic means to the projection and analysis logic means 270. Conductor 594 interconnects the projection analysis logic means and the memory array means. Also, conductor 596 interconnects the projection analysis logic means with the line definition buffer address logic means 269. The line definition buffer address logic means 269 points to an address in the line definition buffer 12 (FIG. 1) where data is to be obtained for operation by the projection analysis logic means and the projection generate and mask logic means. To this end, the line definition buffer address logic means is connected to the line definition buffer address bus 42 by conductor 598. The projection analysis logic means 270 is connected by conductor 600 to the output character address logic 274. Conductor 602 connects the output character addressing logic 274 to the character output buffer bus 31. After proper centering of a character and addition of the control bit is generated, the character is transferred from the output character addressing logic 274 to the appropriate storage character position in the character output buffer 32.

In operation, the microprocessor 26 starts the operation by signalling the address of the two-dimensional shift array and said bit logic 24 on the microprocessor bus 34. When the control logic 262 decodes its address on this bus, it starts the operation of the unit. The control logic 262 then loads a start and stop PEL column for a character from the character position bus 23. The start and stop PEL column information is taken from the find character unit 22 (FIG. 1). The control logic means 262 then calculates the start address for the video (determined by knowing the starting address of the video buffer and truncating the starting column down to a byte address) and calculates the character width in words (again truncating the start down to a byte address and truncating the end plus eight down to a byte address and substracting the start address from it). These values are loaded into the video buffer addressing logic 264. The control logic means then generates a mask to mask the character from its surrounding data and loads this mask into the projection generating mask logic 266. The mask is generated to mask the extraneous data on the margins of the bytes feteched. By way of example, the character may start at the third bit from the byte boundary and the first two bits of all the bytes on the left margin must be masked out. The mask to accomplish this is generated from the PEL column start of the character (PEL column start MODULO 8 mask value on the left). The right margin mask can be generated in the same way from the PEL column start plus the width. The control logic 262 now starts the projection generate and mask logic 266. The projection generate and mask logic means 266 reads data from the video buffer addressing logic means 264 and performs the following action;

1. Masks the incoming scan row (several bytes constructed into the entire row of a character) with the mask loaded by the control logic means 262.
2. Set the projection bit for the row. The projection bit is the logical "OR" of all the bits in the row. If the projection is zero and no previous row had a projection of one, then the next row is fetched.
3. Store the resulting row in the memory array 268 and shift it one PEL up (the data is loaded from the bottom of the array).

The above operations continue until either the number of rows fetched equals the top of the underscore from the line definition buffer 12 (FIG. 2) or the maximum rows have been stored in the memory array 268. In the preferred embodiment of this invention, 32 rows are the maximum number of rows. The projection generate and mask logic 266 now gates the projection vector into the projection analysis logic 270 along with the number of rows fetched. The projection analysis logic 270 reads the baseline and examines that area of the projection vector. If the projection vector is all white at the baseline (plus or minus three PELs) the above baseline bit is set. If the projection vector is all black at the baseline (plus or minus three PELs), a descender bit is set. Also, the underscored data is examined. The data for the region of the character is read from the line definition buffer 12 and masked. If 10 or more black PELs are present, the character is underscored, otherwise a character is not underscored. The projection analysis logic 270 then shifts the memory array 268 up and right until the mask and the projection are centered in the rows and columns of the memory array. In the preferred embodiment of this invention the size of the memory array is a 32×32 matrix.

The projection analysis logic 270 then loads the bits determined above into the output character addressing logic 274 and signals the control logic 262 that it is done.

The control logic 262 then starts the output character addressing logic 273 which reads the memory array data and outputs it with the bits from above to the output character bus 32. The control logic 262 is signalled when it has completed. This ends the operation of the two-dimensional shift array and set bits process and the microprocessor 26 is now signalled to indicate to the character recognition logic that a character is ready.

Microprocessor Controlling the Hardware Units

Figure 10:
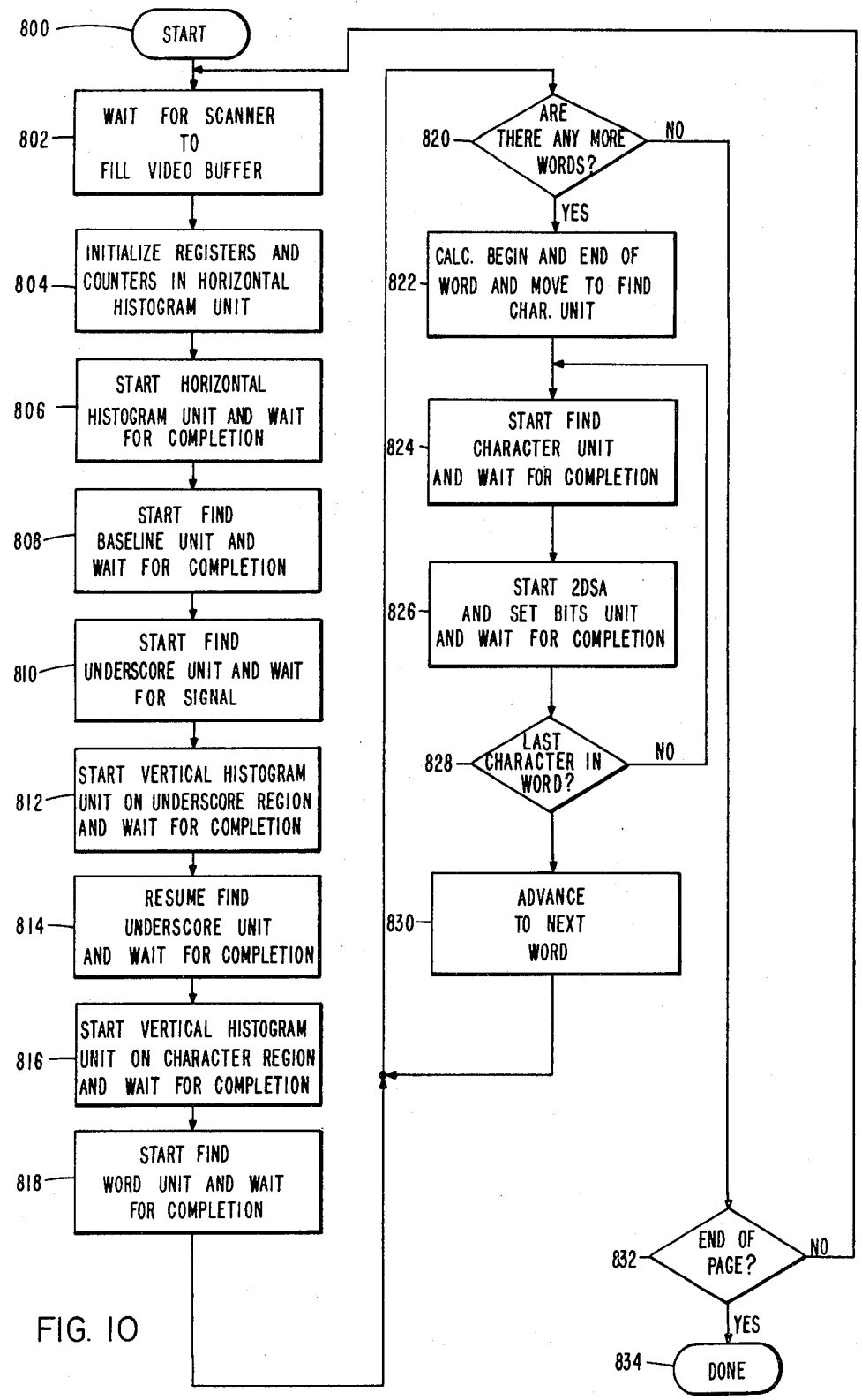
FIG. 10 shows a flowchart for the controller (microprocessor).

Referring now to FIG. 10, the details of the flowchart for the microprocessor controlling the hardware units are shown. The microprocessor execution begins in block 800. The next block executed is block 802 where the microprocessor waits for the scanner to signal that the video buffer is full. The microprocessor then moves to block 804 where it initializes the registers and counters of the horizontal histogram unit in the manner described previously. The microprocessor then moves to block 806 where it starts the horizontal histogram unit, in the manner described previously, and waits for its signal of completion. The microprocessor then moves to block 808 where it starts the find baseline unit, in the manner described previously, and waits for its completion signal.

The microprocessor then moves to block 810 and starts the find underscore unit, in the manner described previously, and waits for its signal that it s ready for vertical histograms. The microprocessor then moves to block 812 and starts the vertical histogram unit, in the manner described previously, after first initializing its line definition address counter 114 (FIG. 5) so that the underscore region of each sector is the region processed. The microprocessor waits for the completion of the vertical histogram unit in block 812, then moves to block 814 where it signals the find underscore unit to resume, in the manner described previously, and waits for it to complete operation. The microprocessor then moves to block 816 where it starts the vertical histogram unit again; this time with the line definition address counter initialized so that the character region of each sector is the region processed. The microprocessor waits for completion of the vertical histogram unit in block 816, then moves to block 818 where it starts the find word unit, in the manner described previously, and waits for it to signal completion.

The microprocessor then moves to block 820 where it tests to see if any words were found by the find word unit. If the test is positive, it moves to block 822; if the test is negative, it moves to block 832, which will be described later. In block 822, the microprocessor calculates the beginning and ending columns of the words from the data in the word definition buffer and writes them to the beginning of word registers 140 (FIG. 8) and the end of word register 144 (FIG. 8) in the find character unit. The microprocessor then moves to block 824 were it stats the find character unit in the manner described previously, and waits for its completion. The microprocessor then moves to block 826 where it starts the two-dimensional shift array and set bits logic, in the manner described previously, and waits for its completion. The microprocessor then moves to block 828 where it tests to see if the character segmented was the last character in the word, in the manner described previously. If it was not the last character in the word, then the processing, starting with block 824, is repeated. If it was the last character in the work, then the microprocessor moves to block 830 where it advances one word in the word definition buffer and then moves to repeat block 820 where it tests to see if any words are left to be processed. Eventually the answer will be no, and the microprocessor will move to block 832 where it interrogates the scanner to determine if it is at the end of the page of the document being scanned. If it is not, the processing is repeated from the beginning (block 802). If it is, then the processing is complete.

It should be understood that the function performed by one or more of the various units described in the preferred embodiment, may be performed by the microprocessor itself at a relatively slower speed. This type of change would not depart from the spirit or scope of the invention.

OPERATION OF THE APPARATUS

In operation the video buffer 2 (FIG. 1) is filled with a line of data to be segmented. The line is representative of a line of data to be reproduced. The microprocessor 26 commands the horizontal histogram unit 4 to begin calculating horizontal histograms for each video sector. As these are calculated, they are placed in the horiontal histogram buffer 6. Upon completion of the horizontal histogram calculation, the microprocessor 26 commands the find baseline unit 8 to begin calculating the baselines for each video sector. The find baseline unit 8 fetches the horizontal histograms from the horizontal histogram buffer 6 and uses them to calculate baselines. As the baselines are determined, data is placed in the line definition buffer 12. Upon completion of the baseline calcuation by the find baseline unit 8, the microprocessor 26 commands the find underscore unit 10 to begin locating underscores. The find underscore unit 10 uses horizontal histograms from the horizontal histogram buffer 6 together with baseline data from the line definition buffer 12 to calculate underscore data, which is then placed in the line definition buffer 12. The find underscore unit 10 may be also require some vertical histograms to be calculated depending on the nature of the line to be segmented. If the vertical histograms are required at this stage, the microprocessor 26 will command the vertical histogram unit 14 to calculate the vertical histogram.

In any case, upon the completion of the find underscore unit 10, the microprocessor 26 commands the vertical histogram unit 14 to begin calculating vertical histograms for the other units. The vertical histogram unit 14 uses the raster scan video from the video buffer 2 together with the baseline data (which delimits the vertical histogram operation) from the line definition buffer 12 to perform its operation. As the vertical histograms are calculated, they are placed in the vertical histogram buffer 16. Upon completion of the operation of the vertical histogram unit 14, the microprocessor 26 may command the find pitch unit 18 to calculate the pitch, or the pitch may already be known to the system. The find pitch unit 14, if it must operate, uses a vertical histogram data in the vertical histogram buffer 16.

Upon completion of the find pitch unit 18, (or upon completion of the vertical histogram unit 14 if the find pitch unit 18 does not need to operate) the microprocessor 26 commands a find word unit to begin the operation of locating words. The find word unit 20 uses the vertical histogram data from the histogram bufer together with the pitch data on the pitch bus 19 from the find pitch unit 18 to find the word locations in the line to be segmented. Data representing the word location is placed in the word definition buffer 30 by the find word unit 20. Upon completion of the find word unit 20, the microprocessor 26 commands a find character unit 22 to begin segmenting individual characters. The find character unit 22 uses a word location data from the word definition buffer 30 together with the vertical histogram data from the vertical histogram buffer 16 and the pitch value from the pitch bus 19 to locate each character. As each character is located it notifies the microprocessor 26, which then commands the two-dimensional shift array 24 to move the character from the video buffer 2 to the character output buffer 32, registering "centering" the character as it does this and setting some bits further describing the character. The two-dimensional shift array 24 uses the character position data over the character position bus 23 from the find character unit 22 to know where in the video buffer the character should be fetched from. After each character is transferred to the character output buffer 32 by the two-dimensional shift array 24, the microprocessor 26 commands the find character unit 22 to locate the next character. This process is repeated until the end of the line is reached.

Although the present invention has been particularly shown and described with reference to a preferred embodiment thereof, it will be understood by those skilled in the art that various changes in form and details may be made therein without departing from the spirit and scope of the invention.

What is claimed is:

1. A method for segmenting data in an OCR device, said method comprising the following steps:
    generating a video stream of data representative of the information contents of a line of data to be segmented;
    generating a horizontal histogram for the video stream of data;
    determining a baseline for the video stream of data;
    generating a vertical histogram for the video data;
    first generating the coordinates for each word in the video stream of data; and
    second generating the coordinate for each character associated with a word.

2. A method for segmenting characters in a row of characters comprising the following steps:
    generating a row of video data representative of the row of characters;
    generating a segmentation template for segmenting said characters, said template being characterized by a matrix of values displaced a predetermined distance within a range of picture elements with a weighted average being assigned to each value;

overlaying said segmentation template on the row of video data;

shifting the template within a predetermined distance;

generating a table of weighted conflict scores and a corresponding table of probable segmentation coordinates for each shift; and selecting the segmentation coordinate with the lowest weighted conflict scores as the final segmentation coordinates.

3. The method of claim 2 wherein the predetermined distance is being positioned on pitch width.

4. Segmentation method for character recognition comprising:

generating a row of video data representative of the row of characters;

generating a segmentation template for segmenting said characters, said template being characterized by a plurality of vertical lines with each vertical line being assigned a weight which reduces away from a selected vertical line; overlaying said segmentation template on the row of video data to identify columns of the data;

summing the products of the weight of each line with a vertical histogram of the associated data column to give a total figure of merit for the column represented by the central line; and shifting the template within a predetermined distance and repeating the process wherein a column coinciding with the selected vertical line having the best figure of merit is the point of segmentation.

5. The method of claim 4 wherein the vertical lines are being positioned on pitch width distance.

6. An apparatus for finding a baseline associated with a row of characters comprising:

a storage means operable to store video data representative of the horizontal histogram for a plurality of sectored video scans;

a means to access the storage means and to generate values representative of the baseline associated with each sector;

a means for interrogating the values and to eliminate values which deviate from adjoining values; and arithmetic means to concatenate the remaining values and to generate a single baseline therefrom.

7. A device for segmenting a line of characters into words comprising:

first means for storing a row of characters;

means to access the stored characters and to generate "white" and "black" projections therefrom;

second means to store the projections; and arithmetic means for manipulating the projections so that black projections are being forced to be multiple of pitch width and the multiple pitch width black projections are being selectively concatenated, thereby removing intercharacter white projections.

8. An apparatus for determining the underscore associated with a document comprising:

a first means for generating a first set of data representative of a baseline for each row of data in said document;

a horizontal histogram means for generating a second set of data representative of a horizontal histogram for the row;

a first control logic means for correlating the first set of data with the second set of data and to generate a third set of data representative of a datum zone; and a second control logic means for defining a window of search below said datum zone and to interrogate the window of search at the internal boundaries to determine underscore.

9. The apparatus of claim 8 further including a vertical threshold find unit, coupled to the second control logic means, said unit being operable for finding the top and bottom of the underscore.

10. The apparatus of claim 8 further including a horizontal limit find unit coupled to the second control logic means, said unit being operable for finding the horizontal length of said underscore.

11. An apparatus for segmenting a stream of video data into characters comprising:

means for segmenting the stream of video data into word boundaries;

means for identifying beginning and ending coordinates of a word;

means for identifying the pitch of said video data;

means for summing the pitch with the beginning of word coordinates to identify a probable segmentation coordinate; and means for correlating the probable segmentation coordinate with a vertical histogram to define a final segmentation point.

12. A segmentation apparatus adaptable for use with an Optical Character Recognition (OCR) device including a scanner for scanning a document and generating a video stream of data representative of the information contents of said document, said segmentation apparatus comprising in combination:

a storage means coupled to the scanner and operable to store the video data;

a horizontal histogram means coupled to the storage means, said horizontal histogram means being operable for generating horizontal histograms for the video data in said storage means;

a find baseline unit means coupled to the horizontal histogram means and operable for finding a baseline for data in said storage means;

a vertical histogram means coupled to the storage means and the find baseline unit means and operable for generating a vertical histogram for data in the storage means;

a find word unit means coupled to the vertical histogram means and operable for finding the coordinates for each word location for a line of data in said storage means;

a character segmentation means connected to the find word unit means and operable for segmenting the words into characters;

shift means connected to the character segmentation means and operable to shift a character from the storage means; and a controller for enabling the operation of said segmentation apparatus.

13. The segmentation apparatus of claim 12 further including a buffer means coupled to the shift means, said buffer means being operable to store characters outputted from the storage means.

14. The segmentation apparatus of claim 12 further including a find pitch unit means coupled to the vertical histogram means and operable to find the pitch for data in the storage means.

15. The segmentation apparatus of claim 12 wherein the storage means includes a random access memory.

16. The segmentation apparatus of claim 12 wherein the horizontal histogram means comprises:

a control logic means having at least one enabling input and a plurality of controlled outputs;

an arithmetic logic control means coupled to the control logic means and operable to calculate the number of black bits associated with a sector of each raster scan of line in said storage means; and a horizontal histogram buffer means for storing data outputted from said arithmetic logic control means.

17. The apparatus of claim 16 wherein the arithmetic logic control means includes:

a sector size register for storing a number representative of the size of a sector in the storage means;

a sector size counter operably coupled to the sector size register;

video buffer address counter for storing an address at which data is being fetched from the storage means;

a shift register operable to receive the data outputted from the storage means;

word counter operable to count bits outputted from the shift register and to periodically generate a signal to decrement the contents of the size counter, and to increment the contents of the video buffer address counter;

a control clock line for stepping the word counter and the shift register;

a horizontal histogram buffer coupled to the size counter and operable to store addresses whereat the count of black bits for a sector is being stored in the horizontal histogram buffer means;

an "AND" circuit means operable to combine the output from the shift register with a clock pulse on the control clock line; and a horizontal histogram counter for counting the bits outputted from the "AND" circuit means.

18. The segmentation apparatus of claim 12 wherein the find baseline unit means includes:

a control logic means;

a horizontal buffer address means coupled to said control logic means and operable to address the storage means;

a character top find unit coupled to the control logic means and operable to search the horizontal histogram for a plurality of scans to determine a baseline associated with a sector of data in the storage means;

a vertical threshold find unit coupled to the control logic means and operable to search the vertical histogram associated with the sector to determine a baseline;

a line definition buffer means for storing values representative of the baseline for each sector;

line definition buffer address logic units operable to address the line definition storage means to retrieve baseline values therefrom; and arithmetic and logic means to correlate the baseline data to form a single baseline value therefrom.

* * * * *